US011737105B2

(12) United States Patent
Luo et al.

(10) Patent No.: US 11,737,105 B2
(45) Date of Patent: Aug. 22, 2023

(54) RESOURCE COORDINATION FOR LOW-LATENCY TRAFFIC IN INTEGRATED ACCESS AND BACKHAUL NETWORKS

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Luca Blessent, Whitehouse Station, NJ (US); Tao Luo, San Diego, CA (US); Karl Georg Hampel, Hoboken, NJ (US)

(73) Assignee: QUALCOMM Incorporated, San Diego, CA (US)

(*) Notice: Subject to any disclaimer, the term of this patent is extended or adjusted under 35 U.S.C. 154(b) by 59 days.

(21) Appl. No.: 16/803,716

(22) Filed: Feb. 27, 2020

(65) Prior Publication Data

US 2020/0351929 A1    Nov. 5, 2020

Related U.S. Application Data

(60) Provisional application No. 62/939,505, filed on Nov. 22, 2019, provisional application No. 62/843,350, filed on May 3, 2019.

(51) Int. Cl.
*H04W 72/23* (2023.01)
*H04W 72/52* (2023.01)

(52) U.S. Cl.
CPC .......... *H04W 72/23* (2023.01); *H04W 72/52* (2023.01)

(58) Field of Classification Search
CPC .......... H04W 72/14; H04W 72/0486
See application file for complete search history.

(56) References Cited

U.S. PATENT DOCUMENTS

| 2016/0234857 | A1* | 8/2016 | Chen | H04L 5/0044 |
| 2018/0323909 | A1* | 11/2018 | Ying | H04L 1/0072 |
| 2019/0181922 | A1* | 6/2019 | Lee | H04B 7/0626 |
| 2019/0349079 | A1* | 11/2019 | Novlan | H04B 7/15542 |
| 2020/0007223 | A1* | 1/2020 | Zhu | H04B 7/2606 |
| 2020/0015295 | A1* | 1/2020 | Stauffer | H04W 24/08 |

(Continued)

OTHER PUBLICATIONS

International Search Report and Written Opinion—PCT/US2020/020533—ISA/EPO—dated Jun. 16, 2020.

(Continued)

*Primary Examiner* — Kevin M Cunningham
(74) *Attorney, Agent, or Firm* — Holland & Hart LLP

(57) ABSTRACT

Methods, systems, and devices for wireless communications are described. A parent wireless node may determine that low latency communications having a latency below a threshold are to be performed with a child wireless node. The parent wireless node may modify, by at least one of the first communication link interface of the parent wireless node, or a second communication link interface of the parent wireless node that is different from the first communication link interface, or a combination thereof, a previously configured resource type for the first communication link interface based at least in part on the low latency communications. The parent wireless node may transmit, from the first communication link interface of the parent wireless node, a grant to the child wireless node indicating that the low latency communications are to be performed.

26 Claims, 21 Drawing Sheets

(56) References Cited

U.S. PATENT DOCUMENTS

2020/0229181 A1* 7/2020 Qi .................. H04W 72/042
2020/0229271 A1* 7/2020 You .................. H04W 16/28

OTHER PUBLICATIONS

Qualcomm Incorporated (Rapporteur): "Report from [105#45]: R2+R3 IAB Miscellaneous", 3GPP Draft, 3GPP TSG-RAN WG2 Meeting #105bis, R2-1905207, Report from 105#45 R2+R3 IAB Misc—Revision, 3rd Generation Partnership Project (3GPP), Mobile Competence Centre, 650, Route Des Lucioles, F-06921 Sophia-Antipolis Cedex, France, vol. RAN WG2, No. Xi?an, China, Apr. 8, 2019-Apr. 12, 2019, Apr. 12, 2019 (Apr. 12, 2019), XP051709675, 37 pages, Retrieved from the Internet: URL: http://www.3gpp.org/ftp/tsg%5Fran/WG2%5FRL2/TSGR2%5F105bis/Docs/R2%2D1905207%2Ezip. [retrieved on Apr. 12, 2019] Section 3.7.

Qualcomm Incorporated: "Resource Management in IAB Network", 3GPP Draft, R1-1813419, 3rd Generation Partnership Project (3GPP), Mobile Competence Centre, 650, Route Des Lucioles, F-06921 Sophia-Antipolis Cedex, France, vol. RAN WG1, No. Spokane, US, Nov. 12, 2018-Nov. 16, 2018, Nov. 11, 2018 (Nov. 11, 2018), XP051555458, 8 Pages, Retrieved from the Internet: URL: http://www.3gpp.org/ftp/Meetings%5F3GPP%5FSYNC/RAN1/Docs/R1%2D1813419%2Ezip. [retrieved on Nov. 11, 2018] the whole document.

Samsung: "On Pre-Emptive SR and BSR in IAB Networks", 3GPP Draft, 3GPP TSG-RAN WG2 #106, R2-1906717, On Pre-Emptive SR and BSR in IAB Networks, 3rd Generation Partnership Project (3GPP), Mobile Competence Centre, 650, Route Des Lucioles, F-06921 Sophia-Antipolis Cedex, France, vol. RAN WG2, No. Reno, Nevada, USA, May 13, 2019-May 17, 2019, May 2, 2019 (May 2, 2019), XP051711024, 3 pages, Retrieved from the Internet: URL: http://www.3gpp.org/ftp/tsg%5Fran/WG2%5FRL2/TSGR2%5F106/Docs/R2%2D1906717%2Ezip. [retrieved on May 2, 2019] the whole document.

* cited by examiner

RESOURCE COORDINATION FOR LOW-LATENCY TRAFFIC IN INTEGRATED ACCESS AND BACKHAUL NETWORKS

CROSS REFERENCE

The present Application for Patent claims the benefit of U.S. Provisional Patent Application No. 62/843,350 by LUO et al., entitled "RESOURCE COORDINATION FOR LOW-LATENCY TRAFFIC IN INTEGRATED ACCESS AND BACKHAUL NETWORKS," filed May 3, 2019, and the benefit of U.S. Provisional Patent Application No. 62/939,505 by LUO et al., entitled "RESOURCE COORDINATION FOR LOW-LATENCY TRAFFIC IN INTEGRATED ACCESS AND BACKHAUL NETWORKS," filed Nov. 22, 2019, both assigned to the assignee hereof, and both expressly incorporated by reference herein.

FIELD OF THE INVENTION

The following relates generally to wireless communications, and more specifically to resource coordination for low-latency traffic in integrated access and backhaul (IAB) networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may include donor wireless nodes, which may also be referred to as anchor nodes or devices, to facilitate wireless communication between a UE and the network. In some cases, a donor wireless node (or anchor node) may have a high-capacity, wired, backhaul connection (e.g., fiber) to the network, while communicating simultaneously with one or more downstream wireless nodes (e.g., downstream relay devices) or UEs. A network that supports communications between a wireless node and a UE may be referred to as an access network, while a network that supports communications between one or more wireless nodes may be referred to as a backhaul network and/or a wireless backhaul. In deployments supporting both access and backhaul, the network may be an IAB network.

Some wireless communication systems may also support traffic having low latency, high redundancy, and the like, requirements. One example of such low latency traffic includes, but is not limited to, ultra-reliable low latency traffic (URLLC) that may have an associated end-to-end latency for some URLLC service classes of 1 ms, 10 ms, etc. Moreover, the reliability requirement for some URLLC service class may be as high as $10^5$, $10^6$, etc. However, some IAB networks may preconfigure resource types that, in some instances, are restricted for use by some of the wireless devices, which may create delays in the handling of such low latency traffic. This may create difficulties in communicating low latency traffic between the wireless nodes of an IAB network in a manner that supports the low latency/high reliability requirements.

SUMMARY

The described techniques relate to improved methods, systems, devices, and apparatuses that support resource coordination for low-latency traffic in integrated access and backhaul (IAB) networks. Generally, the described techniques support communicating low latency traffic (e.g., ultra-reliable low latency communications (URLLC)) over wireless nodes in an IAB network. Generally, each wireless node in an IAB network may be configured with a first communication link interface (e.g., a distributed unit (DU) function) and a second communication link interface (e.g., a mobile termination (MT) function). The first communication link interface (DU) serves as a scheduling node within the IAB-node for its child nodes, where the child nodes may include child access UEs and/or child MTs. A child MT is the second communication link interface of a child IAB-node. The links between the IAB-node and its child nodes are called child links, which include child access links and/or child backhaul links. The second communication link interface (MT) serves as a scheduled node within the IAB-node, and is scheduled by one or multiple parent DUs. A parent DU is the first communication link interface of a parent node. The links between the IAB-node and its parent nodes are called parent backhaul links.

More particularly, a central unit (CU) function of a donor wireless node (e.g., a wireless node within the IAB network having a direct network connection, such as a fiber link) may configure various resource types for the DU functions of its downstream wireless nodes and/or configure resource types for the MT functions (e.g., via radio resource control (RRC) configuration signaling) to use for wireless communications. Therefore, the MT function (e.g., the second communication link interface) may be scheduled from the DU function of the parent wireless node and/or via RRC configuration from the CU function of the donor wireless node. Conventionally, some configured resource types may be restricted, controlled, or otherwise unavailable for modification/use by the DU and/or MT functions of a wireless node. More particularly, in an IAB-network the resource type at each resource for DU can be configured by CU of IAB-donor as "Hard/Soft/not available (NA)", which governs DU and MT's behavior at an IAB-node. Conventionally, depending on resource type, DU or MT may be restricted to use a resource for communication.

However, aspects of the described techniques may support the DU and/or MT functions of a wireless node in an IAB network modifying a previously configured resource type to support communicating low latency traffic across the IAB network. For example, the DU function (e.g., the first communication link interface) of a parent wireless node may determine that there is low latency traffic to communicate with a child wireless node. The determination may be based on a scheduling request (SR) received from the child wireless node (e.g., in the uplink scenario), based on receiving information addressed to the child wireless node, and the like. The DU and/or MT function may modify a previously configured resource type, e.g., override or otherwise capture the resources, in response to the determination that the low latency communications are to be performed. Accordingly, the DU function of the parent wireless node may transmit a grant (e.g., a downlink control information (DCI) grant) that carries or otherwise conveys an indication that low latency communications are to be performed. Accordingly, the DU function of the parent wireless node may communicate the low latency communications (e.g., uplink and/or downlink communications) with the child wireless node using at least a portion of the resources of the modified previously configured resource type, e.g., based on modifying the previously configured resource type. This may enable the IAB network to communicate uplink and/or downlink low latency traffic in a manner that complies with the latency requirements, reliability requirements, and the like, for the URLLC class-type traffic.

In a more specific uplink example, periodic or semi-static resources (e.g., configured grant (CG) resources) may be configured for the parent wireless node, the child wireless node, and the like. The periodic or semi-static resources may be configured by the CU of the donor node, in some examples, e.g., previously configured resources. Some or all of the periodic or semi-static resources may be associated with a resource type that is otherwise associated as being restricted, controlled, or otherwise unavailable for modification/use by the DU and/or MT functions of a wireless node. Subsequently, the child wireless node may transmit a SR to the parent wireless node indicating that low latency communications are to be performed with the parent wireless node. Based on the low latency communications to be performed, the parent wireless node and/or child wireless node (e.g., the DU and/or MT functions) may modify (e.g., override) the resource type for at least some of the periodic or semi-static resources such that the modified resource type corresponds to resources for use in the low latency communications. Accordingly, the parent wireless node and child wireless node may perform the low latency communications using at least some of the periodic or semi-static resources (e.g., the resource type for those resources).

DETAILED DESCRIPTION

Figure 1:
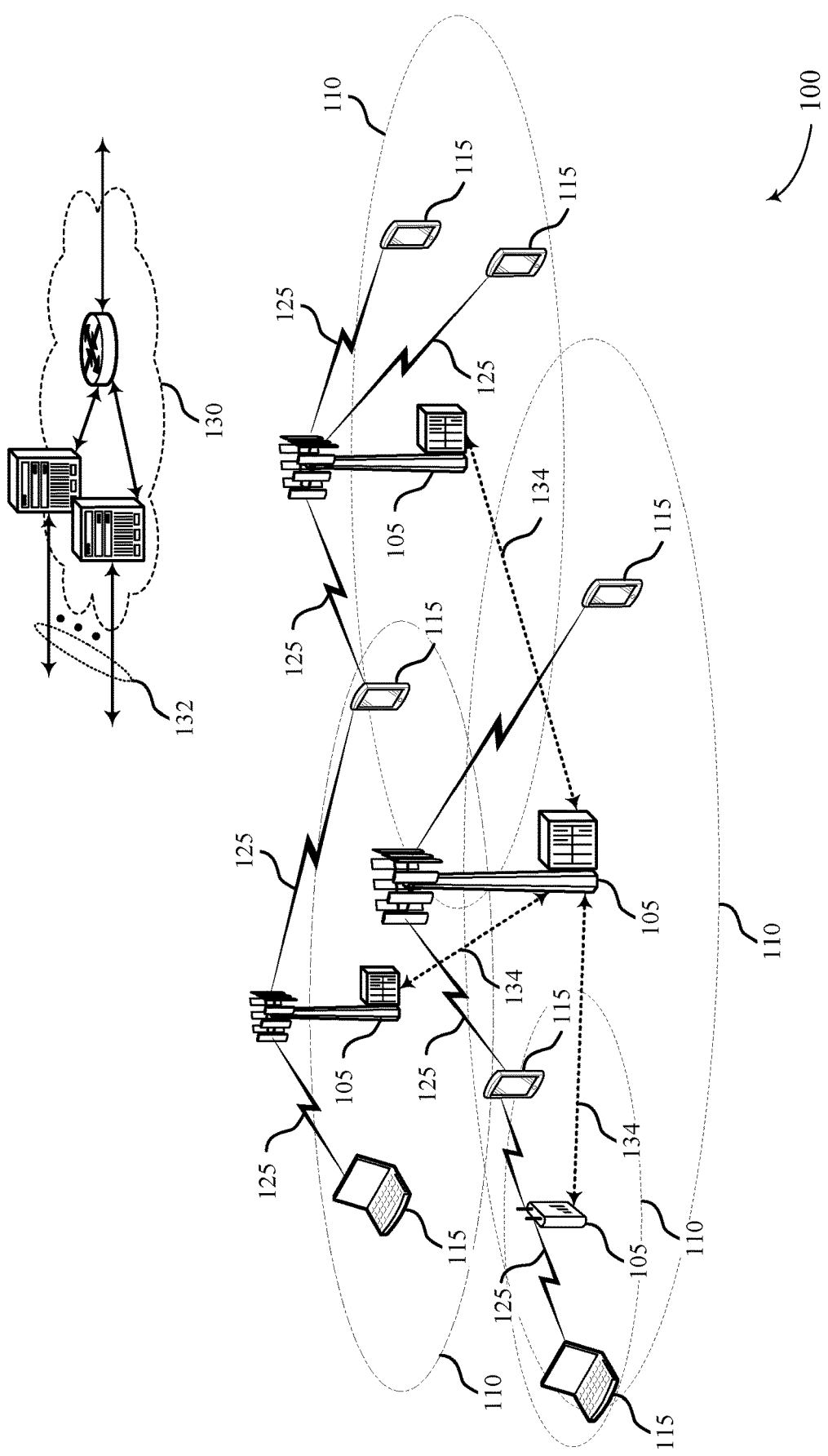
FIG. 1 illustrates an example of a system for wireless communications that supports resource coordination for low-latency traffic in integrated access and backhaul (IAB) networks in accordance with aspects of the present disclosure.

Some wireless communication systems may support an integrated access and backhaul (IAB) network that includes an IAB donor wireless node and one or more wireless nodes downstream from the donor node. In some aspects, an IAB network shares resources between access and backhaul links. Generally, the IAB donor node (which may also be referred to as an anchor node) is an access node having a wireline connection to the core network. The donor node may have a central unit (CU) function that is a central entity that controls or otherwise configures resources within the IAB network. The donor node may also have a distributed unit (DU) function that serves as a scheduling node to schedule child nodes of the IAB donor node. Downstream from the IAB donor node may include one or more IAB nodes (also referred to as wireless nodes) within the IAB network, with each downstream IAB node constituting a hop within the IAB network. Each IAB node may relay traffic from an IAB donor node through one or more hops. In one example, each IAB node may have the DU function (e.g., a first communication link interface) and a mobile termination (MT) function (e.g., a second communication link interface). The DU function of the IAB node may act as a scheduling node that schedules child nodes of this particular IAB node, which may be a user equipment (UE) and/or a child wireless node (e.g., a UE and/or a base station within the IAB network). The MT function may serve as a scheduled node similar to a UE that is scheduled by its parent IAB node. In this context, the parent IAB node may be an IAB donor node (e.g., an anchor node) or a parent IAB node within the IAB network (e.g., an upstream wireless node).

Resources within an IAB network are generally shared by the wireless nodes, and may include different resource types. The CU function of the IAB-donor may configure resource patterns for each IAB-node DU, which indicates resource type of "Hard/Soft/NA" for DU at each resource. Depending on resource type of DU, a DU or MT of an IAB-node may be restricted to use a resource for communication. While this may be acceptable in some instances, this may create difficulties in the situation where communications having a latency below a threshold are to be communicated through the IAB network (upstream and/or downstream). For example, communications having a latency requirement below a threshold, a reliability requirement above a threshold, and the like, may be considered low latency communications, which may be an example of ultra-reliable low latency communications (URLLC). Accordingly, the resource types for the resources configured for the DU/MT functions of the wireless nodes within an IAB network may not allow any or some specific communication (e.g., communication with specific direction downlink (DL) or uplink (UL)) at or using the configured resources, which may lead to larger latency in the situation where low latency communications are to be performed.

Accordingly, aspects of the described techniques provide a mechanism whereby previously configured resource types may be modified (e.g., overridden) by the DU function (e.g., a first communication link interface) and/or the MT function (e.g., a second communication link interface) of an IAB wireless node based on low latency communications. For example, a parent wireless node (e.g., a an IAB-donor node or an IAB-node in the IAB network) may determine that low latency communications are to be performed with a child wireless node (e.g., a downstream UE and/or base station within the IAB network). In some aspects, the parent wireless node may determine that the low latency communication are to be performed with a child node based on receiving a low-latency packet or an indication of low-latency communication from the grand-parent node (parent of the parent node) that shall be relayed to the child node on next-hop. In an uplink low latency communications example, the parent wireless node may determine that the UL low latency communication are to be performed with a child node based on an indication of UL low-latency communication (e.g., a scheduling request (SR) associated with a logical channel for low-latency communication) from the child node. In response to the low latency communications, the DU function and/or the MT function of the parent wireless node may modify a previously configured resource type for the DU function. For example, the DU and/or MT functions may override at least a portion of the resources in the previously configured resource type to use for communicating the low latency communications. Similarly and in an uplink example, the DU and/or MT functions of the child wireless node may override at least a portion of the resources in the previously configured resource type to use for communicating the low latency communications. Accordingly, the DU function may transmit a grant to a child wireless node (in a downstream scenario) that carries or conveys an indication that the low latency communications are to be performed. In some aspects, the grant may also identify resources to be used for communicating the low latency communications. In some aspects, the grant may also carry resource coordination information for next-hop between child node and grand-child node. Accordingly, the DU function of the parent wireless node may communicate the low latency communications with the child wireless node using the portion of the resources from the previously configured resource type (e.g., the overridden resources from the previously configured resource type). Accordingly, the low latency communications may be passed along the wireless nodes of the IAB network in a manner that supports latency and/or reliability requirements of the low latency communications.

In a more specific uplink example, periodic or semi-static resources (e.g., configured grant (CG) resources) may be configured for the parent wireless node, the child wireless node, and the like. The periodic or semi-static resources may be configured by the CU of the donor node, in some examples, e.g., previously configured resources. Some or all of the periodic or semi-static resources may be associated with a resource type that is otherwise associated as being restricted, controlled, or otherwise unavailable for modification/use by the DU and/or MT functions of a wireless node. Subsequently, the child wireless node may transmit a SR to the parent wireless node indicating that low latency communications are to be performed with the parent wireless node. Based on the low latency communications to be performed, the parent wireless node and/or child wireless node (e.g., the DU and/or MT functions) may modify (e.g., override) the resource type for at least some of the periodic or semi-static resources such that the modified resource type corresponds to resources for use in the low latency communications. Accordingly, the parent wireless node and child wireless node may perform the low latency communications using at least some of the periodic or semi-static resources (e.g., the resource type for those resources).

Aspects of the disclosure are initially described in the context of a wireless communications system. Aspects of the disclosure are further illustrated by and described with reference to apparatus diagrams, system diagrams, and flowcharts that relate to resource coordination for low-latency traffic in IAB.

FIG. 1 illustrates an example of a wireless communications system 100 that supports resource coordination for low-latency traffic in IAB in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
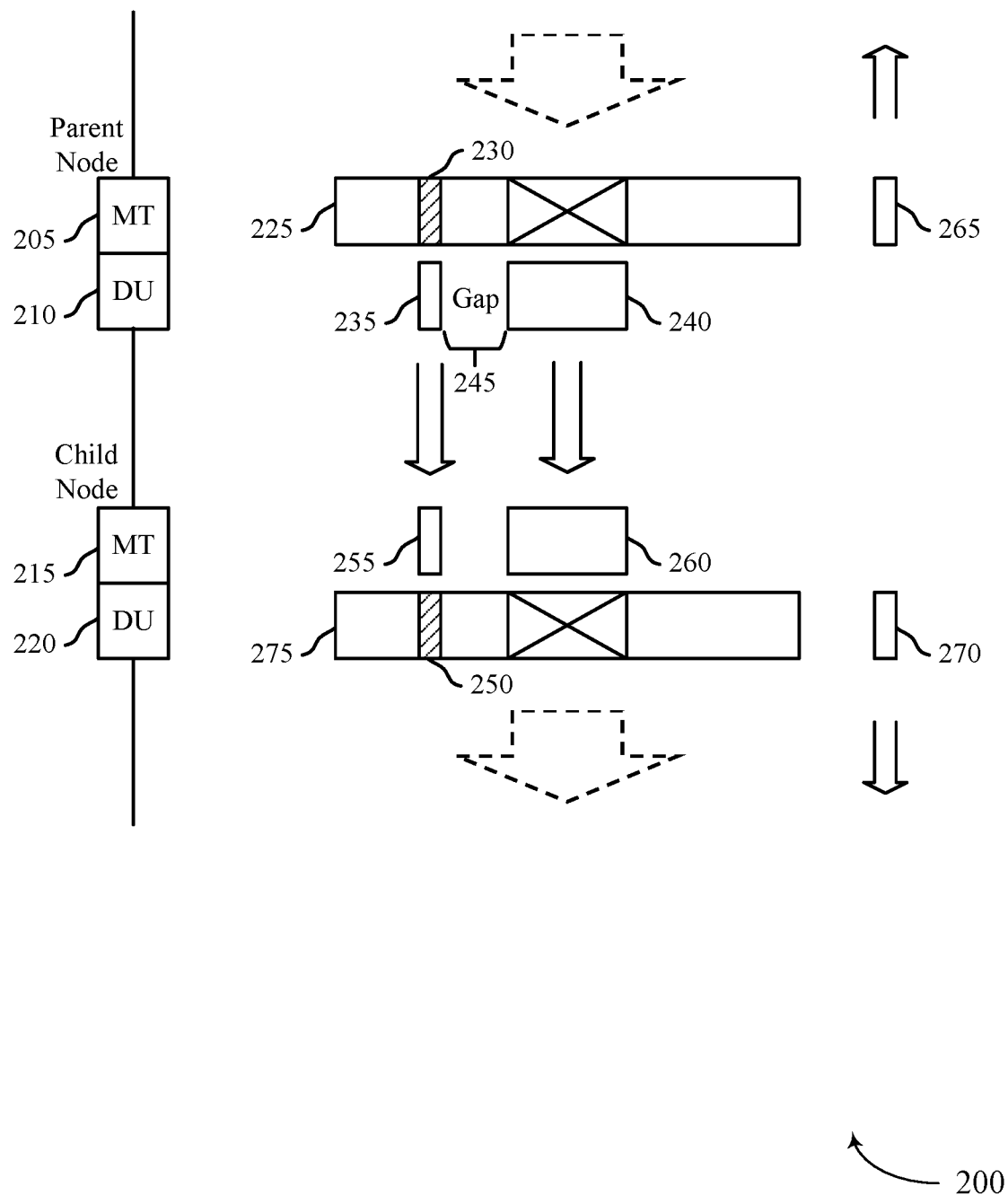
FIG. 2 illustrates an example of an IAB network that supports resource coordination for low-latency traffic in IAB in accordance with aspects of the present disclosure.

FIG. 2 illustrates an example of a IAB network 200 that supports resource coordination for low-latency traffic in IAB in accordance with aspects of the present disclosure. In some examples, IAB network 200 may implement aspects of wireless communications system 100. IAB network 200 may include a parent wireless node having an MT function 205 and a DU function 210, a child wireless node having a MT function 215 and a DU function 220. In some aspects, a parent wireless node refers to an TAB-donor or an TAB-node in an TAB-network, and a child wireless node refers to a child UE that are scheduled by the parent wireless node via parent DU interface or a child TAB-node whose MT interface is scheduled by the parent wireless node via parent DU interface.

Although only two wireless nodes are shown in TAB network 200, it is to be understood that more wireless nodes may be included in TAB network 200. Moreover, it is also to be understood that TAB network 200 may include an anchor wireless node (e.g., an TAB donor node) that has a link to a core network. In some aspects, the MT function 205 may be considered a second communication link interface and the DU function 210 may be considered a first communication link interface of the parent wireless node. Similarly, the MT function 215 may be considered a second communication link interface and the DU function 220 may be considered a first communication link interface of the child wireless node.

In some aspects, TAB network 200 may share various resources (e.g., time, frequency, spatial, etc., resources) between access and backhaul links. As discussed, TAB network 200 may include a donor node or anchor node having a wireline connection to a core network. The donor node may include a CU function that controls one or more aspects of the TAB network using configuration signaling (e.g., RRC configuration signaling, F1-AP signaling, and the like). The donor node may also include a DU function that acts as a scheduling node that schedules child nodes of the TAB donor node. In some aspects, the parent wireless node and/or the child wireless node may be considered an TAB node or access node that relays traffic to/from an TAB donor node through one or more hops. The wireless nodes within the TAB network (e.g., other than TAB donor node or anchor node) may each have an MT function that serves as a scheduled node similar to a UE scheduled by its parent node, and a DU function that acts as a scheduling node that schedules child nodes of the wireless node. In some aspects, the child node can be a UE and/or a child TAB node.

In some aspects, various resource management solutions may be utilized within TAB network 200, e.g., to handle half-duplex constraints. A half-duplex constraint may refer to a node being unable to transmit and receive at the same time over the same frequency band. To address such constraint, resource management solutions may include a TDM, SDM/FDM transmit and/or SDM/FDM receive resource configurations.

A resource management framework may be implemented between the wireless nodes of IAB network 200. In some aspects, the resource management framework may include a periodic or semi-static configuration of resource patterns (or resource types) by the CU function of the IAB donor node over an F1-AP interface between the CU function and DU function of IAB-nodes, such as DU function 210 of the parent wireless node and/or DU function 220 of the child wireless node. For example, the configuration of an IAB node DU function may include sending RRC messages for child MT functions of an IAB node. Accordingly, the DU function of a wireless node (such as DU function 210) may transfer RRC configuration signaling of the CU function of the donor node to the MT function 215 of the child wireless node. In some aspects, this may include the DU function 210 dynamically scheduling the MT function 215 with resources. Moreover, the DU function 210 may also manage one or more aspects of the dynamic control of the DU function 220 of the child wireless node's soft resources.

In addition to periodic or semi-static configuration, IAB network 200 may employ dynamic control of the child DU using soft resources by the parent wireless node (e.g., the DU function 210 may dynamically control resources of DU function 220). In some aspects, the dynamic control may include an explicit indication from the parent node, e.g., such as a slot format indicator (SFI)-like DCI signaling. Additionally or alternatively, the dynamic control of the child DU soft resources may use an implicit method, the child DU can use soft resources if it knows that the usage will not impact the MT function's ability to transmit/receive according to its configuration and scheduling.

As discussed, various resource types may be configured for the wireless nodes within IAB network 200. The expected behavior of the wireless nodes within IAB network 200 may be based, at least in some aspects, according to the resource type that is configured for a DU function (such as DU function 210 and/or DU function 220). One example of a resource type may include a Not Available (N/A) resource type where the DU function cannot assume that it can use this resource. Another example of a resource type may include a hard resource where the DU function can assume it can use this resource regardless of the MT function's configuration. The hard resource type may be used for downlink communications (H-DL), uplink communications (H-UL), and/or the resources may be flexible (H-F) (e.g., the resources may be used for uplink or downlink communications). Another example of a resource type may include a soft resource type, which may include resources that are controlled by the parent node through an explicit and/or implicit indication (e.g., the DU function 210 may control the resources in a configured soft resource type of DU function 220). In some aspects, the soft resource type may include two states. The first state may include a soft+ resource type (indicated as available) in which the DU function can assume it can use the resources (e.g., similar to a hard resource type). The second state may include a soft− resource type (not indicated as available) in which the DU function cannot assume it can use the resources (e.g., similar to a N/A resource type). Broadly the MT functions of an IAB node resource type may be similar to the resource type that can be configured for a UE (e.g., such as downlink, uplink, flexible communication resources). In some aspects, a UE/MT function of a wireless node may transmit/receive according to scheduling from its parent node or according to RRC configuration signaling from the CU function of an IAB donor node.

As discussed, dynamic signaling for resource configuration may use an explicit indication for a soft resource type. That is, a soft resource type may be indicated as available by a parent node via a DCI indication, e.g., may extend existing SFI with a new field "NULL" to indicate that the soft resource of the DU function of a child wireless node is released by the parent node so that it is available for the DU function of the child wireless node to use. In another example, a new DCI format may be defined to explicitly indicate that the soft resource is available for use by the DU function of the child wireless node. Accordingly, the resource types may be semi-statically configured, but then may be dynamically reconfigured using an explicit and/or implicit DCI indication.

As also discussed, the dynamic signaling for resource configuration may use an implicit indication for a soft resource type. That is, an IAB node may know that the DU function's resources can be used without impacting the MT function's ability to transmit/receive according to its resource configuration and scheduling, e.g., by constraining a scheduling gap K0, the DU function of the child wireless node may decide whether to use the soft resources based on the parent node scheduling decision. An example of this may include a case where the PDCCH (e.g., the DCI indication) may only be at the beginning of a slot. In another case, the PDCCH can be any symbol of the slot. In this context, the PDCCH may refer to a PDCCH occasion of the DU function and/or of the MT function.

In some aspects, IAB network 200 may support URLLC services, e.g., communicating low latency traffic across one or more nodes of IAB network 200. In some aspects, this may include communicating traffic with an end-to-end latency for URLLC service classes of 1 ms, 10 ms, etc., by way of example. The reliability requirement for some URLLC service class can be as high as $10^5$, $10^6$, etc., by way of example. Technologies that may be implemented within IAB network 200 to support URLLC traffic may include, but are not limited to, flexible scheduling of a mini slot with [2, 4, 7] symbols, a specific CQI-to-MCS mapping for URLLC with very low target block level error rate (BLER), a downlink/uplink preemption indication (PI), an uplink configured grant, and the like.

In some aspects, there may be a problem with respect to communicating low latency traffic across IAB network 200 using conventional techniques. For example, there may be an associated processing time in communicating the low latency traffic within a particular wireless node. In some aspects, the processing time may refer to the time difference between when a low latency packet is received at the MT function of a wireless node and then transmitted downstream by the DU function of the wireless node. The processing time may be attributable to the decoding, layer two processing, encoding for the next hop, and the like. Additional difficulties using conventional techniques may include the case where a non-ideal DU function resource type alignment occurs between the IAB wireless nodes over scheduled resources. An ideal DU resource type alignment over scheduled resources may include the DU function 210 of the parent wireless node being configured with a hard/soft+ resource type with the MT function 215 of the child wireless node being configured with an N/A/soft- resource type. In this alignment, the DU function 210 may simply allocate the necessary resources for transmitting the low latency communications downstream and/or upstream. However, there may be non-ideal resource type alignment scenarios that introduces excessive delays in communicating low latency traffic according to conventional techniques. Examples of such non-ideal resource type alignment between the DU function 210 of a parent wireless node and the MT function 215 of a child wireless node may include, but are not limited to, hard/soft+ with N/A/soft+, N/A/soft- with hard/soft+, N/A/soft- with N/A/soft-, and the like. Accordingly, aspects of the described techniques may be beneficial to handle the case with non-ideal DU function resource type alignment between IAB nodes over scheduled resources. Although the described techniques are generally discussed in terms of downlink or downstream communication of low latency traffic, it is to be understood that the described techniques are not limited to downlink or downstream traffic but may, instead, be utilized for uplink or upstream communication of low latency traffic.

In some aspects, IAB network 200 may be configured such that PDCCH resources have been coordinated previously so that the DCI grant for URLLC traffic can be received successfully by a child wireless node, e.g., using adaptive PDCCH, dynamic PDCCH sharing, fast notification, in-advance scheduling, etc., to address the coordination for PDCCH for delay-sensitive traffic. Accordingly, aspects of the described techniques may address the delivery of URLLC traffic over a data channel given that the DCI grant has been successfully received by a child wireless node.

In some aspects, a scheduling gap may be considered between the PDCCH DCI grant and the allocated PDSCH (e.g., for the low latency communication). In one case, the scheduling gap may be greater than the PDCCH decoding time. In this case, at the first allocated symbol for URLLC traffic, the child wireless node may know that the allocation is for URLLC (e.g., low latency communications) and may take special actions for reception of the URLLC packet, e.g., to override its expected behavior defined by a given configured resource type. In another case, the scheduling gap may be less than the PDCCH decoding time period. In this case, the child wireless node may not be able to take special action for reception of the URLLC traffic. A special case may be where the scheduling gap equals zero, such that PDCCH DCI grant overlaps with the first allocated PDSCH symbol. A PDCCH occasion may span one to three symbols, and typical PDCCH decoding time can be one or two symbols.

Accordingly, aspects of the described techniques may include a DCI grant carrying or otherwise conveying a low latency indication (e.g., an indication that low latency communications are to be performed). In some aspects, the DCI grant may indicate that low latency communications are to be performed so that an IAB node (e.g., such as the parent and/or child wireless node) may take different actions (e.g., modifying, overriding, etc.) for low latency traffic from normal traffic on scheduled resources upon receipt of the DCI grant. In order for the IAB node to take special action on scheduled resources upon reception of the DCI grant indicating low latency communications, the scheduling gap between the PDCCH and the PDSCH may be higher than the PDCCH decoding time.

In some aspects, the indication of the low latency communications in the DCI may be carried explicitly in the DCI grant using an optional field and/or implicitly carried or otherwise conveyed by a particular MCS, e.g., MCS-C-RNTI. In some aspects, MCS-C-RNTI may be used to indicate the use of an MCS table with a very low target BLER, which may be likely associated with URLLC traffic (e.g., low latency communications). In some aspects, the DCI grant may carry additional information, such as resource information/coordination for the next hop. In some examples, the DCI grant may take some existing DCI format with an enhanced field or a new DCI format may be used.

Accordingly, the DU function 210 of the parent wireless node may determine that low latency communications are to be performed with the child wireless node. However, the MT function 205 of the parent wireless node may have an ongoing communications 225 (e.g., an ongoing reception at the parent wireless node MT function 205). In some aspects, IAB network 200 illustrates the example where the resource type alignment includes a previously configured N/A/soft- resource type at the DU function 210 with the DU function 220 of the child wireless node being previously configured with a hard/soft+ resource type.

In some aspects, the MT function 205 (e.g., the second communication link interface) and/or the DU function 210 (e.g., the first communication link interface) of the parent wireless node may modify the previously configured resource type for the DU function 210 based, at least in some aspects, on the low latency communications. In some aspects, this may include the parent wireless node determining to send the URLLC packets using resources in the DU function 210 previously configured N/A/soft- resource type. In some aspects, this may include the parent wireless node overriding the expected behavior defined by the previously configured N/A/soft- resource type. When there is an ongoing communication at the MT function 205 of the parent wireless node (as is shown in IAB network 200), the MT function 205 may stop transmitting/receiving on the overlapping resources in order for the DU function 210 to use the resources for communicating the URLLC traffic (e.g., the low latency communications).

As is illustrated in IAB network 200, this may include a PDCCH occasion 230 in which the parent wireless node is configured as available for transmitting a DCI grant 235 in the instance that low latency communications are to be performed. Accordingly, the MT function 205 may pause its ongoing communications 225 during the PDCCH occasion 230 to allow the DU function 210 to transmit a DCI grant 235, in some situations. In this instance, the DU function 210 may determine that the low latency communications (e.g., URLLC traffic or any other communications having a latency requirement below a threshold) are to be performed with the child wireless node. For example, the DU function 210 may receive an indication from a grandparent or upstream wireless node of the IAB network 200 indicating that low latency communications are to be performed. In another example, the parent node, by the MT interface, may receive an URLLC packet from the grandparent node and identify that this received packet shall be relayed to a child node, and then the parent node will send a DCI grant with low-latency indication to the child node. In another example, the parent node may receive a scheduling request from the child wireless node that carries or otherwise conveys an indication that low latency communications are to be performed.

As is discussed, the DCI grant 235 may explicitly indicate the low latency communications (e.g., using a field in the grant to indicate the low latency indications) and/or implicitly using an RNTI in the grant (e.g., using an RNTI associated with low latency communications, such as an MCS-C-RNTI).

Subsequently, the DU function 210 of the parent wireless node may transmit the low latency communications 240 to the child wireless node using the resources identified in the DCI grant 235. As is indicated by the blocked out portion of ongoing communications 225, this may include at least a portion of the resources of the previously configured resource type (of the MT function 205 in this example). Accordingly, the DU function 210 may determine that the previously configured resource type includes resources that are restricted for the DU function 210 to use for communicating, but may override (e.g., modify) the previously configured resource type anyway in order to allocate resources for communicating the low latency communications 240. In some aspects, the MT function 205 of the parent wireless node may transmit an interruption indication or message 265 to an upstream wireless node indicating that the ongoing communications 225 were interrupted, e.g., in response to the low latency communications. That is, the MT function 205 of the parent wireless node may send an "MT interruption indication" on one or more interrupted symbols to a grandparent wireless node of the parent wireless node, e.g., to ensure efficient retransmission of the interrupted communications. In some aspects, the ongoing communications 225 may have been previously scheduled by a grandparent node and/or semi-statically configured by the CU function of the anchor IAB node.

As discussed, there may be a scheduling gap 245 between transmission of the DCI grant 235 and the low latency communications 240 with the child wireless node. If the previously configured resource type of the DU function 220 of the child wireless node is a hard/soft+ resource type, the scheduling gap 245 may be larger than the PDCCH decoding time. In this way, at the first allocated symbol for URLLC, the child wireless node may be aware of the URLLC allocation and may take special actions for reception of the URLLC.

That is, the MT function 215 of the child wireless node may receive a DCI grant 255 from the parent wireless node indicating that low latency communications are to be performed. As discussed, in some examples the DCI grant 255 may carry or convey an indication identifying the resources for the low latency communications. In some aspects, the MT function 215 and/or the DU function 220 of the child wireless node may modify a previously configured resource type for the DU function 220 based at least in part on the low latency communications. That is, upon reception of the DCI grant 255 with the low latency indication, a child wireless node may grant a higher priority to the MT function 215 in order to use resources for the low latency communications 260 regardless of the previously configured resource type of the DU function 220. In the situation where the DU function 220 has a previously configured resource type of hard/soft+, the child wireless node may override the expected behavior defined by the hard/soft+ resource type. As is illustrated in IAB network 200, the DU function 220 may be performing ongoing communications 275. In some aspects, the MT function 215 of the child wireless node may be configured with a PDCCH occasion 250 in which MT function 215 of the child wireless node monitors for the DCI grant 255. In response to receiving the DCI grant 255, the ongoing communications 275 may be interrupted (e.g., the resources may be overridden) in order to support communication of the low latency communications 260. That is, if there is an ongoing communication 275 at the DU function 220 of the child wireless node, the DU function 220 may stop transmitting/receiving on the overlapping resources and give the MT function 215 priority to use the resources for receiving the URLLC traffic (e.g., the low latency communications 260). The ongoing communications 275 may have been previously scheduled by a child DU function and/or semi-statically configured by the CU function of an IAB donor node. Accordingly, the child wireless node may override the resources, at least partial resources, of the ongoing communications 275 in order to communicate the low latency communications 260 with the parent wireless node.

In some aspects, the child wireless node may transmit an interruption message 270 (e.g., a DU preemption indication) on one or more of the interrupted symbols of the ongoing communications 275 to a grand-child node (e.g., the downstream wireless device that was participating in the ongoing communications 275). This may provide for the efficient decoding and/or HARQ combining at the downstream wireless node.

In the situation where the previously configured resource type of the DU function 220 is a N/A/soft− resource type, the MT function 215 may already have priority to use the resources over its parent's backhaul link. In this situation, the scheduling gap 245 may be smaller than the PDCCH decoding time.

Figure 3:
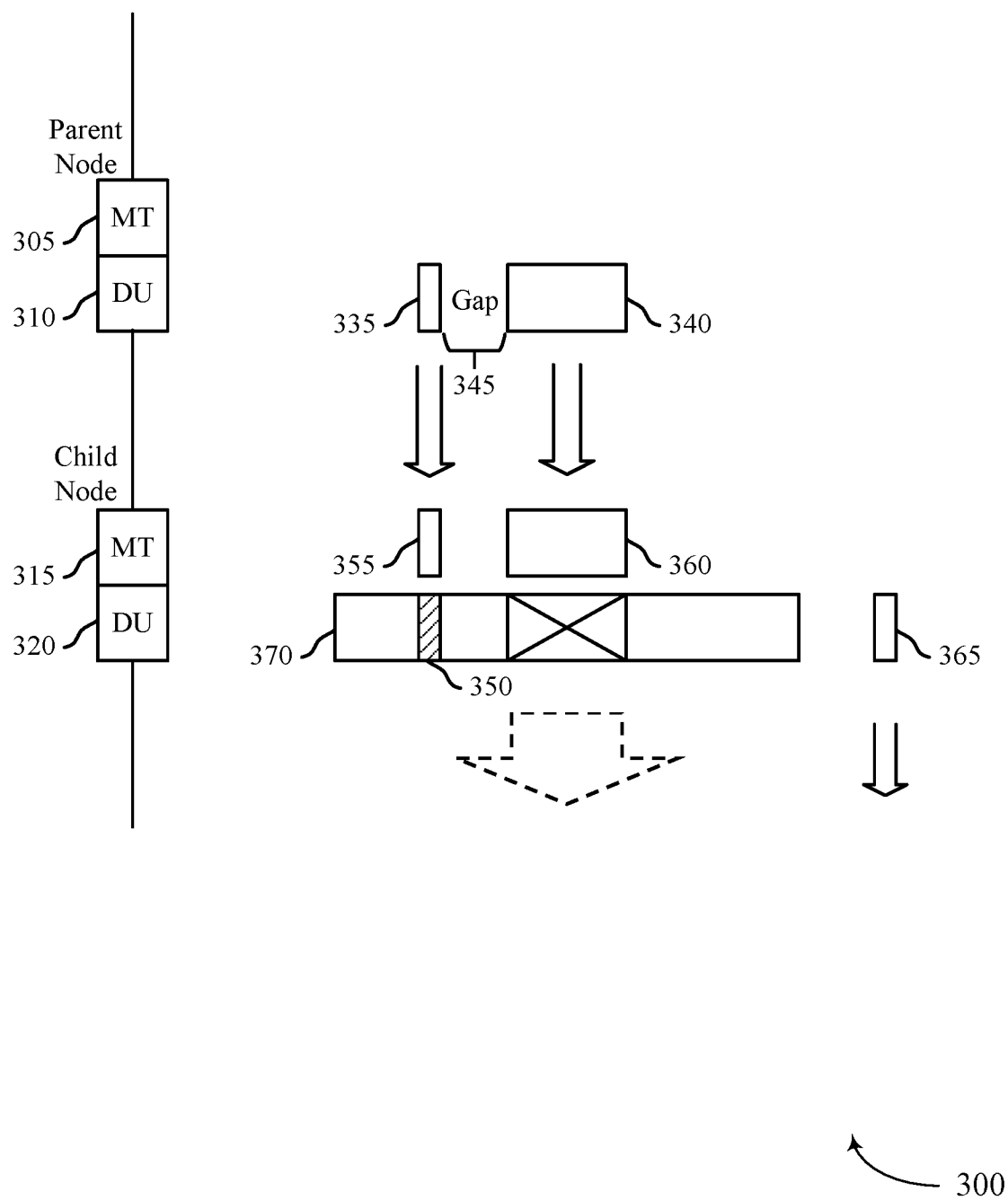
FIG. 3 illustrates an example of an IAB network that supports resource coordination for low-latency traffic in IAB in accordance with aspects of the present disclosure.

FIG. 3 illustrates an example of a IAB network 300 that supports resource coordination for low-latency traffic in IAB in accordance with aspects of the present disclosure. In some examples, IAB network 300 may implement aspects of wireless communication system 100 and/or IAB network 200. IAB network 300 may include a parent wireless node having an MT function 305 and a DU function 310, a child wireless node having a MT function 315 and a DU function 320. In some aspects, the parent wireless node and/or the child wireless node may be a UE and/or a base station, which may be examples of the corresponding devices described herein.

Although only two wireless nodes are shown in IAB network 300, it is to be understood that more wireless nodes may be included in IAB network 300. Moreover, it is also to be understood that IAB network 300 may include an anchor wireless node (e.g., an IAB donor node) that has a link to a core network. In some aspects, the MT function 305 may be considered a second communication link interface and the DU function 310 may be considered a first communication link interface of the parent wireless node. Similarly, the MT function 315 may be considered a second communication link interface and the DU function 320 may be considered a first communication link interface of the child wireless node.

Generally, IAB network 300 illustrates the example where the previously configured resource type of the DU function 310 and the DU function 320 are both hard/soft+, e.g., each DU function may assume that it can use the resources regardless of its associated MT function's configuration.

Accordingly, the DU function 310 may transmit a DCI grant 335 to the child wireless node. In some aspects, the DCI grant 335 may carry or convey an indication that low latency communications are to be performed, e.g., explicitly and/or implicitly.

Following the scheduling gap 345, the DU function 310 may transmit the low latency communications 340 to the child wireless node using the resources that are identified in the grant. In some aspects, the resources identified in the grant may include at least a portion of the resources of the previously configured resource type.

The MT function 315 of the child wireless node may receive the DCI grant 355 indicating that low latency communications are to be performed. As discussed, the DCI grant 355 may carry or convey an indication identifying resources for the low latency communications. Accordingly, the MT function 315 and/or the DU function 320 of the child wireless node may modify a previously configured resource type for the DU function 320 based on the low latency communications. In the example illustrated in IAB network 300, this may include the DU function 320 interrupting ongoing communications 370 being performed with a downstream wireless node. Instead, at least a portion of the resources of the ongoing communications 370 may be overridden (e.g., modified) and used to communicate the low latency communications 360 with the parent wireless node. Accordingly, the MT function 315 may communicate the low latency communications 360 with the parent wireless node using the resources identified in the grant that at least partially overlap with the resources of the previously configured resource type. In this example, the child wireless node may transmit an interruption message 365 (e.g., a DU preemption indication) on one or more of the interrupted symbols.

That is, the child wireless node may determine that the previously configured resource type includes resources that are restricted for the MT function 315 to use for communicating with the parent wireless node and are, instead, allocated for the DU function 320 to use for communicating with the downstream wireless node. In this context, the MT function 315 may override the portion of the resources of the previously configured resource type to use for receiving the DCI grant 355 and performing the low latency communications 360 with the parent wireless node and the DU function 320 may override the portion of the resources of the previously configured resource type to cancel communicating (e.g., the ongoing communications 370) with the downstream wireless node.

Figure 4:
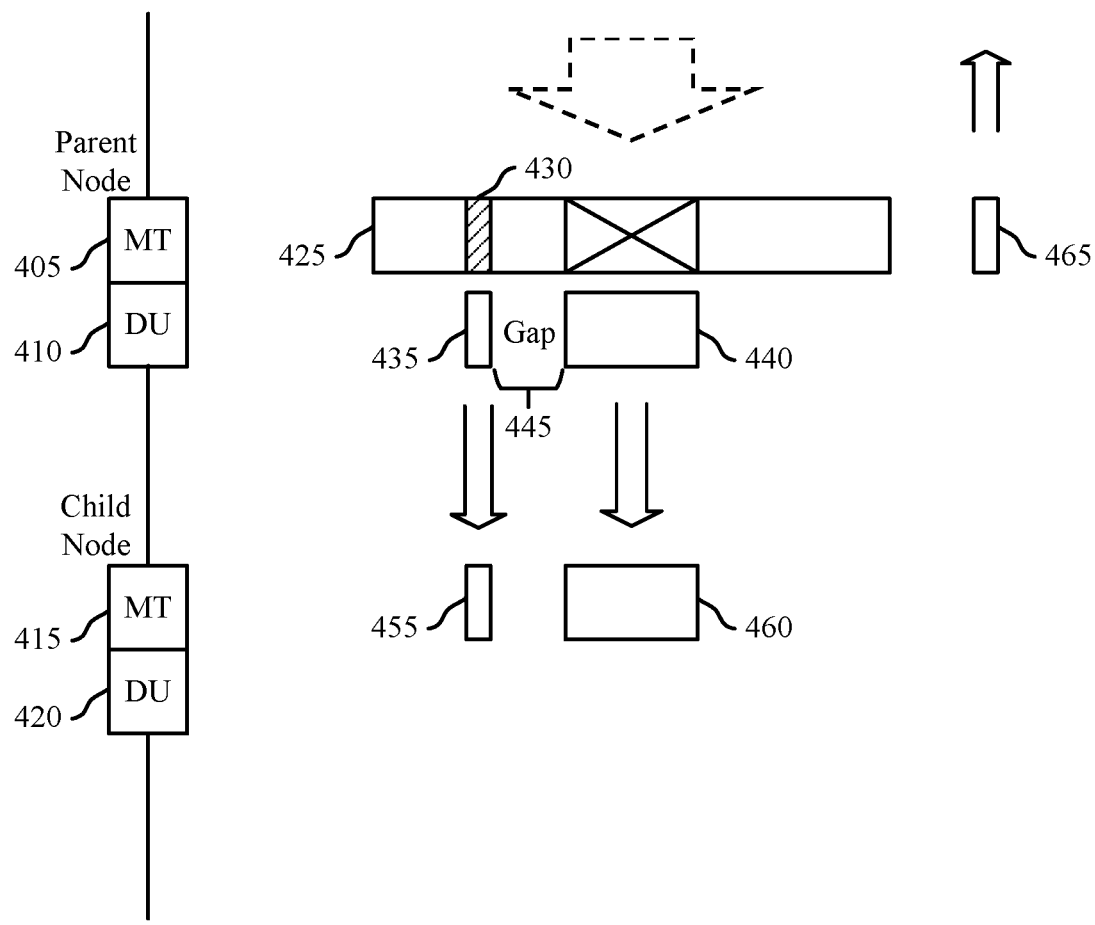
FIG. 4 illustrates an example of an IAB network that supports resource coordination for low-latency traffic in IAB in accordance with aspects of the present disclosure.

FIG. 4 illustrates an example of a IAB network 400 that supports resource coordination for low-latency traffic in IAB in accordance with aspects of the present disclosure. In some examples, IAB network 400 may implement aspects of wireless communications system 100 and/or IAB networks 200 and/or 300. IAB network 400 may include a parent wireless node having an MT function 405 and a DU function 410, a child wireless node having a MT function 415 and a DU function 420. In some aspects, the parent wireless node and/or the child wireless node may be a UE and/or a base station, which may be examples of the corresponding devices described herein.

Although only two wireless nodes are shown in IAB network 400, it is to be understood that more wireless nodes may be included in IAB network 400. Moreover, it is also to be understood that IAB network 400 may include an anchor wireless node (e.g., an IAB donor node) that has a link to a core network. In some aspects, the MT function 405 may be considered a second communication link interface and the DU function 410 may be considered a first communication link interface of the parent wireless node. Similarly, the MT function 415 may be considered a second communication link interface and the DU function 420 may be considered a first communication link interface of the child wireless node.

Generally, IAB network 400 illustrates the example where the previously configured resource type of the DU function 410 and the DU function 320 are both N/A/soft−, e.g., each DU function may not assume that it can use the resources.

Accordingly, in the example illustrated in IAB network 400 the MT function 405 may have an ongoing communications 425, with the ongoing communications 425 including the PDCCH occasion 430 where a DCI grant for low latency communications may be communicated. However, the DU function 410 may determine that low latency communications are to be performed with the child wireless node. Based at least in part on the low latency communications, the MT function 405 and/or the DU function 410 may modify the previously configured resource type for the DU function 410 and/or the MT function 405. In this example, this may include the MT function 405 interrupting its ongoing communication 425 and overriding at least a portion of the resources of its previously configured resource type to use for communicating the low latency communications 440. Accordingly, the DU function 410 may transmit a DCI grant 435 to the child wireless node. In some aspects, the DCI grant 435 may carry or convey an indication that low latency communications are to be performed, identify resources for communicating the low latency communications, and the like.

Following the scheduling gap 445, the DU function 410 may transmit the low latency communications 440 to the child wireless node using the resources that are identified in the grant. In some aspects, the resources identified in the grant may include at least a portion of the resources of the previously configured resource type, e.g., the resources previously used for ongoing communications 425. In some aspect, the MT function 405 may transmit an interruption message 465 to the upstream wireless device indicating that the ongoing communications 425 have been interrupted, e.g., to support efficient retransmission.

The MT function 415 of the child wireless node may receive the DCI grant 455 indicating that low latency communications are to be performed. As discussed, the DCI grant 455 may carry or convey an indication identifying resources for the low latency communications. Accordingly, the MT function 415 and/or the DU function 420 of the child wireless node may modify a previously configured resource type for the DU function 420 based on the low latency communications. Accordingly, the MT function 415 may communicate the low latency communications 460 with the parent wireless node using the resources identified in the DCI grant 455 that at least partially overlap with the resources of the previously configured resource type. That is, the child DU resource type may be NA/Soft−, so there may not be any ongoing communication at the child DU function 420. Since child MT function 415 has higher priority to use the resource, the scheduling gap 445 can be smaller than PDCCH decoding time, e.g., scheduling gap can be 0.

Figure 5:
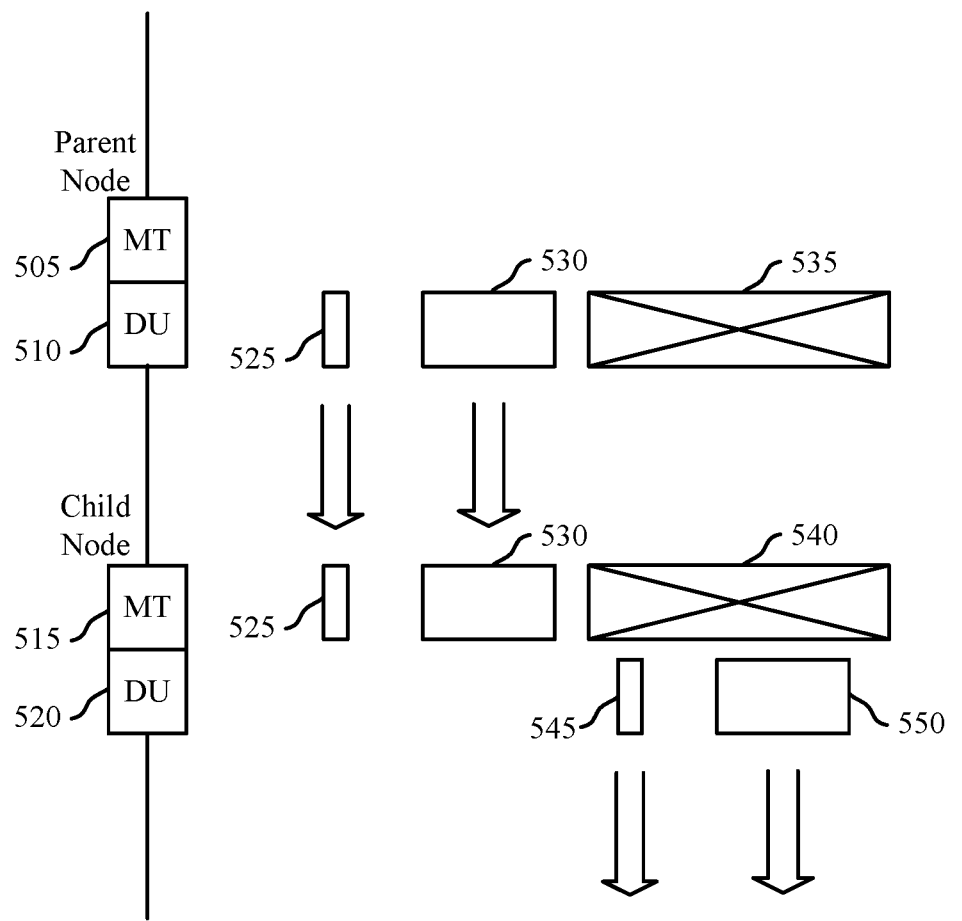
FIG. 5 illustrates an example of an IAB network that supports resource coordination for low-latency traffic in IAB in accordance with aspects of the present disclosure.

FIG. 5 illustrates an example of a IAB network 500 that supports resource coordination for low-latency traffic in IAB in accordance with aspects of the present disclosure. More particularly, IAB network 500 may support in-advance resource coordination for next-hop low-latency traffic in IAB in accordance with aspects of the present disclosure. In some examples, IAB network 500 may implement aspects of wireless communications system 100 and/or IAB networks 200, 300, and/or 400. IAB network 500 may include a parent wireless node having an MT function 505 and a DU function 510, and a child wireless node having a MT function 515 and a DU function 520. In some aspects, the parent wireless node and/or the child wireless node may be a IAB node, which may be examples of the corresponding devices described herein.

Although only two wireless nodes are shown in IAB network 500, it is to be understood that more wireless nodes may be included in IAB network 500. Moreover, it is also to be understood that IAB network 500 may include an anchor wireless node (e.g., an IAB donor node) that has a link to a core network. In some aspects, the MT function 505 may be considered a second communication link interface and the DU function 510 may be considered a first communication link interface of the parent wireless node. Similarly, the MT function 515 may be considered a second communication link interface and the DU function 520 may be considered a first communication link interface of the child wireless node.

Generally, IAB network 500 illustrates the example where the parent wireless node and the child wireless node are relay nodes with respect to communicating low latency communications within IAB network 500. Instead, the parent wireless node and the child wireless node may have previously scheduled communications 535 and 540, respectively, which may be cancelled to support communicating low latency communications downstream within IAB network 500.

Accordingly, in the example illustrated in IAB network 500 the DU function 510 may determine that low latency communications are to be performed with the child wireless node. Based at least in part on the low latency communications, the MT function 505 and/or the DU function 510 may modify the previously configured resource type for the DU function 510 and/or the MT function 505. In this example, the DU function 510 may cancel previously scheduled communications 535. Accordingly, the DU function 510 may transmit a DCI grant 525 to the child wireless node. In some aspects, the DCI grant 525 may carry or convey an indication that low latency communications are to be performed.

The DU function 510 may transmit the low latency communications 530 to the child wireless node using the resources that are identified in the grant. In some aspects, the resources identified in the grant may include at least a portion of the resources of the previously configured resource type, e.g., the resources previously used for scheduled communications 535.

The MT function 515 of the child wireless node may receive the DCI grant 525 indicating that low latency communications are to be performed. As discussed, the DCI grant 525 may carry or convey an indication identifying resources for the low latency communications, which may include next-hop resources for the child wireless node to use for communicating the low latency communications to a downstream device. Accordingly, the MT function 515 and/or the DU function 520 of the child wireless node may modify a previously configured resource type for the DU function 520 and/or the MT function 515 based on the low latency communications. In the example illustrated in IAB network 500, this may include the MT function 515 cancelling scheduled communications 540 to be performed with the parent DU function 510. Instead, at least a portion of the resources of the scheduled communications 540 may be overridden and used to transmit the DCI grant 545 and the low latency communications 550 from the child wireless node to a downstream wireless node. That is, in some aspects the previously scheduled communications 535 and 540 (e.g., with K0>0) may be semi-statically configured communications that may be canceled beforehand, and thus there may be no need to send an interruption message in this case. For the child wireless node, a previously configured resource type of soft– may be changed to soft+ upon reception of the availability indication.

Thus, in some aspects the DCI grant 525 with the low latency indication may carry explicit or implicit resource coordination information for the next-hop, e.g., an availability indication of one or more soft resources of DU function 520 for the next-hop. With this in-advance resource coordination, when an IAB-node delivers a URLLC packet at the next-hop to its child node, the corresponding DU function 520 previously configured resource type may be soft+ instead of soft–. Upon reception of the resource coordination for the next-hop, the child wireless node may cancel the previous scheduling or semi-static configuration over resources that are overlapped with URLLC transmission for the next-hop beforehand. In one example, this may include the activation indication for the child wireless node's additional PDCCH resources for URLLC. In another example, this may include the cancellation of previously scheduled eMBB traffic (e.g., scheduled communications 540) to the MT function 515 to avoid conflicting with the DU function 520 delivery of URLLC to its grand-child (e.g., downstream wireless device). In an explicit approach, the resource coordination information for the next-hop may be explicitly carried by the DCI grant 525. In an implicit approach, the resource coordination information for the next-hop may be defined by specification or semi-statically configured by the CU function of the IAB donor node, and may be applied by the child wireless node upon reception of the DCI grant 525 with the low latency indication.

Figure 6:
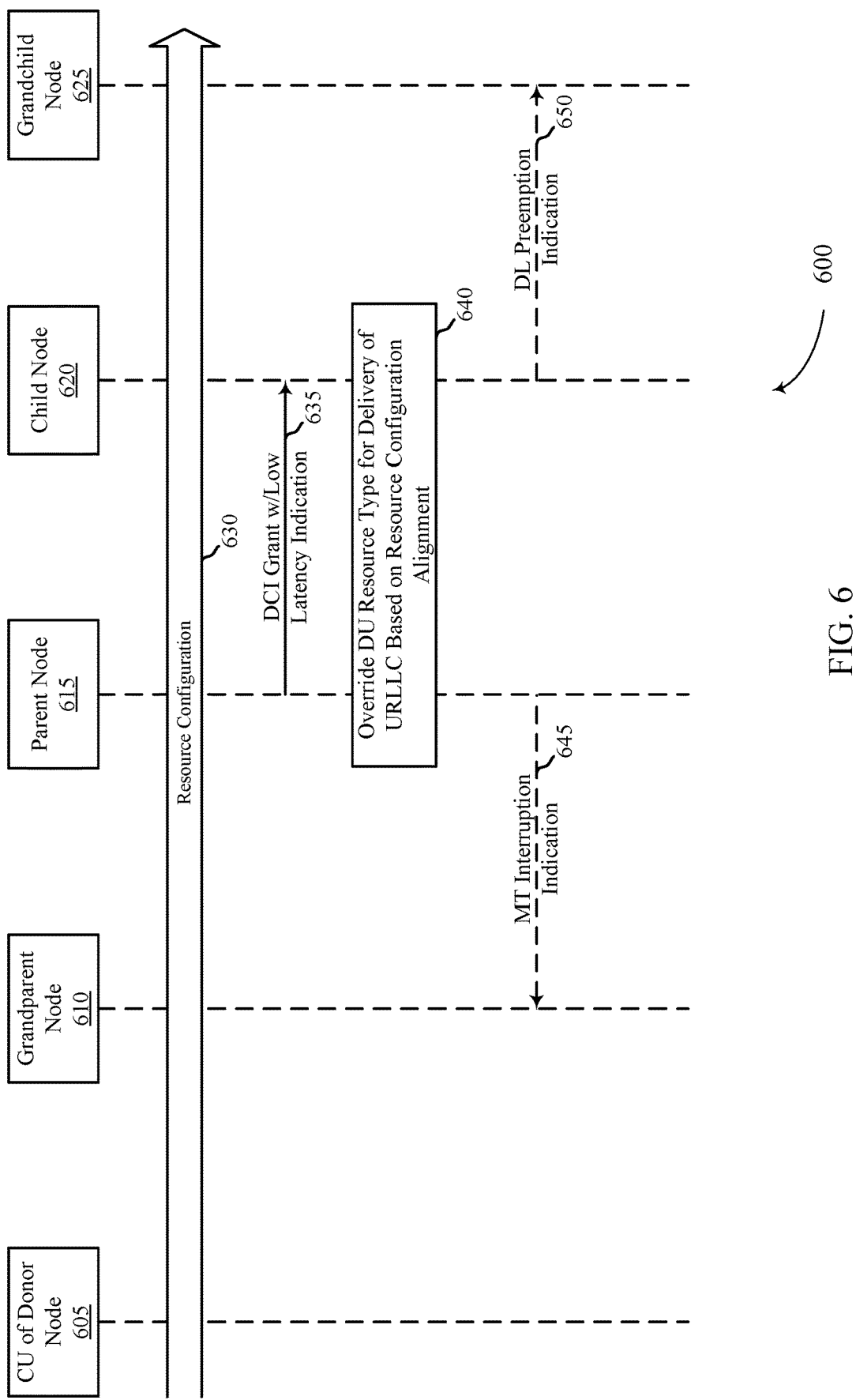
FIG. 6 illustrates an example of a process that supports resource coordination for low-latency traffic in IAB in accordance with aspects of the present disclosure.

FIG. 6 illustrates an example of a process 600 that supports resource coordination for low-latency traffic in IAB in accordance with aspects of the present disclosure. In some examples, process 600 may implement aspects of wireless communications system 100, IAB networks 200, 300, 400, and/or 500. Aspects of process 600 may be implemented by a donor node 605, a grandparent wireless node 610, a parent wireless node 615, child wireless node 620, and/or a grand-child wireless node 625, which may be examples of the UE and/or a base station in an IAB network as described herein.

At 630, the donor node 605 (e.g., the CU function of donor node 605) may semi-statically configure resource types for the various nodes within the IAB network. For example, the donor node 605 may transmit various RRC messages and/or F1-AP messages from the donor node 605 in order to configure the resource types. In some aspects, these may constitute the configured resource types (e.g., a N/A resource type, a hard resource type, a soft resource type, etc.) for the respective nodes. In some aspects, the resource type configurations may be performed over an F1-AP interface, a Uu interface, and the like.

At 635, the parent wireless node 615 may transmit or otherwise provide (and the child wireless node 620 may receive) a grant (e.g., a DCI grant) carrying or conveying an indication that low latency communications are to be performed with the child wireless node 620. For example, the parent wireless node 615 may have determined that low latency communications having a latency below a threshold are to be performed with the child wireless node 620. In some aspects, the grant may explicitly indicate that low latency communications are to be performed (e.g., using a field, a bit, etc.) and/or may implicitly indicate that low latency communications are to be performed (e.g., using an RNTI that is associated with low latency communications, such as an MCS-C-RNTI). In some aspects, the grant may also carry or otherwise convey an indication of the resources being used to communicate the low latency communications. The resources may be for communicating the low latency communications between the parent wireless node 615 and the child wireless node 620 and/or may identify next-hop resources that can be used for the child wireless node 620 to communicate the low latency communications downstream, e.g., to grandchild wireless node 625.

Accordingly and at 640, the parent wireless node 615 and/or the child wireless node 620 may modify, e.g., the DU function and/or the MT function of the parent wireless node 615 and/or the child wireless node 620, a previously configured resource type for the DU function in response to the low latency communications. That is, the DU functions and/or the MT functions of the parent wireless node 615 and/or the child wireless node 620 may modify the resource type that is configured at 630 in response to determining that the low latency communications are to be performed. In some aspects, this may include determining that at least one of the preconfigured resource types includes restricted resources in which the DU function and/or the MT function is not conventionally allowed to use. Regardless though, the DU function and/or MT function of the parent wireless node 615 and/or the child wireless node 620 may override at least a portion of the resources in the respective previously configured resource type.

In some aspects, this may include the parent wireless node 615 and/or the child wireless node 620 canceling, at least to some degree, ongoing communications between the parent wireless node 615 and the grandparent wireless node 610 and/or between the child wireless node 620 and the grandchild wireless node 625. Accordingly and at 645, the parent wireless node 615 may transmit an MT interruption indication (e.g., in interruption message) to the grandparent wireless node 610. Similarly and that 650, the child wireless node 620 may transmit a DU preemption indication (e.g., and interruption message, such as a preemption indicator) to the grandchild wireless node 625.

Accordingly, aspects of the described techniques provide a mechanism whereby one or more wireless nodes within an IAB network may modify previously configured resource types that were otherwise restricted from modification in order to support communicating low latency communications within the IAB network.

Figure 7:
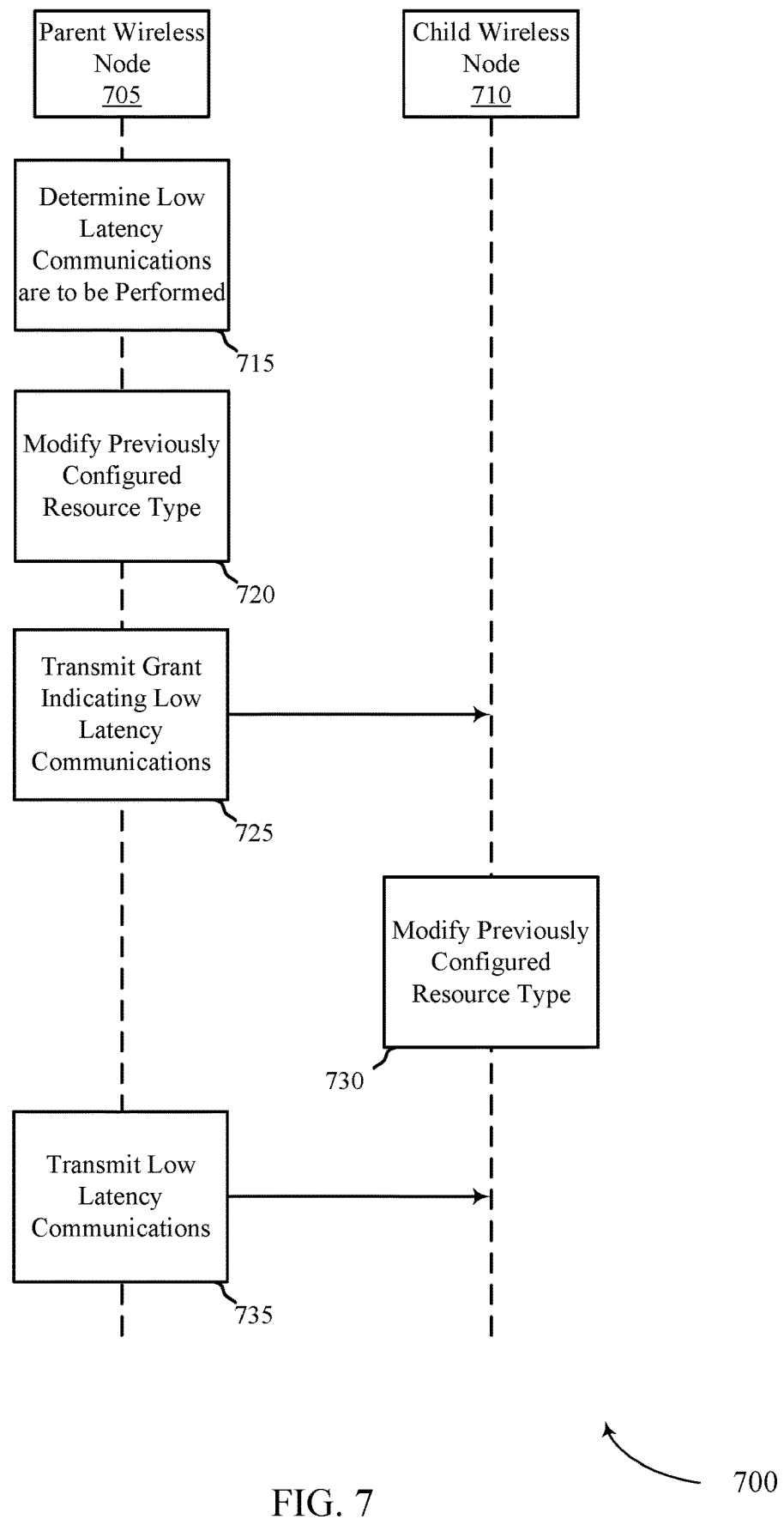
FIG. 7 illustrates an example of a process that supports resource coordination for low-latency traffic in IAB in accordance with aspects of the present disclosure.

FIG. 7 illustrates an example of a process 700 that supports resource coordination for low-latency traffic in IAB in accordance with aspects of the present disclosure. In some examples, process 700 may implement aspects of wireless communications system 100, IAB networks 200, 300, 400, 500, and/or process 600. Aspects of process 700 may be implemented by a parent wireless node 705 and a child wireless node 710, which may be examples of the UE and/or a base station as is described herein.

At 715, a first wireless communication link interface (e.g., a DU function) of the parent wireless node 705 may determine that low latency communications having a latency blow threshold are to be performed with the child wireless node 710. In some aspects, this may be based on the parent wireless node 705 receiving an indication of the low latency communications from an upstream wireless device in the IAB network. In some aspects, this may be based on the parent wireless node 705 receiving a scheduling request from the child wireless node 710.

At 720, the first communication link interface (e.g., the DU function) and/or the second communication link interface (e.g., the MT function) may modify a previously configured resource type for the first communication link interface based at least in part on the low latency communications.

In some aspects, this may include the parent wireless node 705 determining that the previously configured resource type includes resources that are restricted for the first communication link interface to use for communicating with the child wireless node 710, and are allocated for the second communication link interface to use for communicating with an upstream wireless node. In this context, the first communication link interface may override (e.g., modify) the portion of the resources of the previously configured resource type to use for transmitting the grant and communicating the low latency communications with the child wireless node 710. In some aspects, this may include a communication link interface overriding a portion of the resources of the previously configured resource type to cancel communicating with an upstream wireless node. In some aspects, the previously configured resource type may include a N/A resource type and/or a soft resource type indicator is not available (e.g., a soft- resource type).

At 725, the parent wireless node 705 may transmit (and the child wireless node 710 may receive), at the first communication link interface of the parent wireless node 705, a grant indicating that the low latency communications are to be performed. In some aspects, the grant may identify resources to use for communicating the low latency communications. In some aspects, this may include the parent wireless node configuring a field in the grant to indicate that the low latency communications are to be performed (e.g., an explicit indication). In some aspects, this may include the parent wireless node 705 selecting an RNTI that is associated with low latency communications for the grant to convey the indication that the low latency communications are to be performed.

In some aspects, this may include the parent wireless node 705 configuring the grant to indicate next-hop resources for the child wireless node 710 to use to for communicating the grant and the low latency communications to a grandchild wireless node.

At 730, the child wireless node 710 may modify, by the first communication link interface (e.g., the DU function) and/or the second communication link interface (e.g., the MT function) of the child wireless node 710, a previously configured resource type for the first communication link interface based at least in part on the low latency communications.

In some aspects, this may include the child wireless node 710 determining that the previously configured resource type includes resources that are restricted for the second communication link interface to use for communicating with the parent wireless node 705, but are allocated for the first communication link interface to use for communicating with a downstream wireless node. In this context, the second communication link interface may override (e.g., modify) the portion of the resources of the previously configured resource type to use for receiving the grant and the low latency communications from the parent wireless node 705. Moreover, the first communication link interface may override the portion of the resources of the previously configured resource type to cancel communicating with the downstream wireless node. In this context, the previously configured resource type may include a hard resource type and/or a soft resource type indicated as available (e.g., a soft+ resource type).

At 735, the parent wireless node 705 may transmit (and the child wireless node 710 may receive) the low latency communications using resources identified in the grant. In some aspects, the resources identified in the grant may include at least a portion of the resources of the previously configured resource type.

In some aspects, this may include the parent wireless node 705 determining that the resource configuration of the child wireless node 710 includes control channel resources used for transmitting the grant. In this context, the parent wireless node may select, based at least in part on the control channel resources and the processing time of the child wireless node 710, a scheduling gap that includes a time gap between transmitting the grant and communicating the low latency communications with the child wireless node 710.

Figure 8:
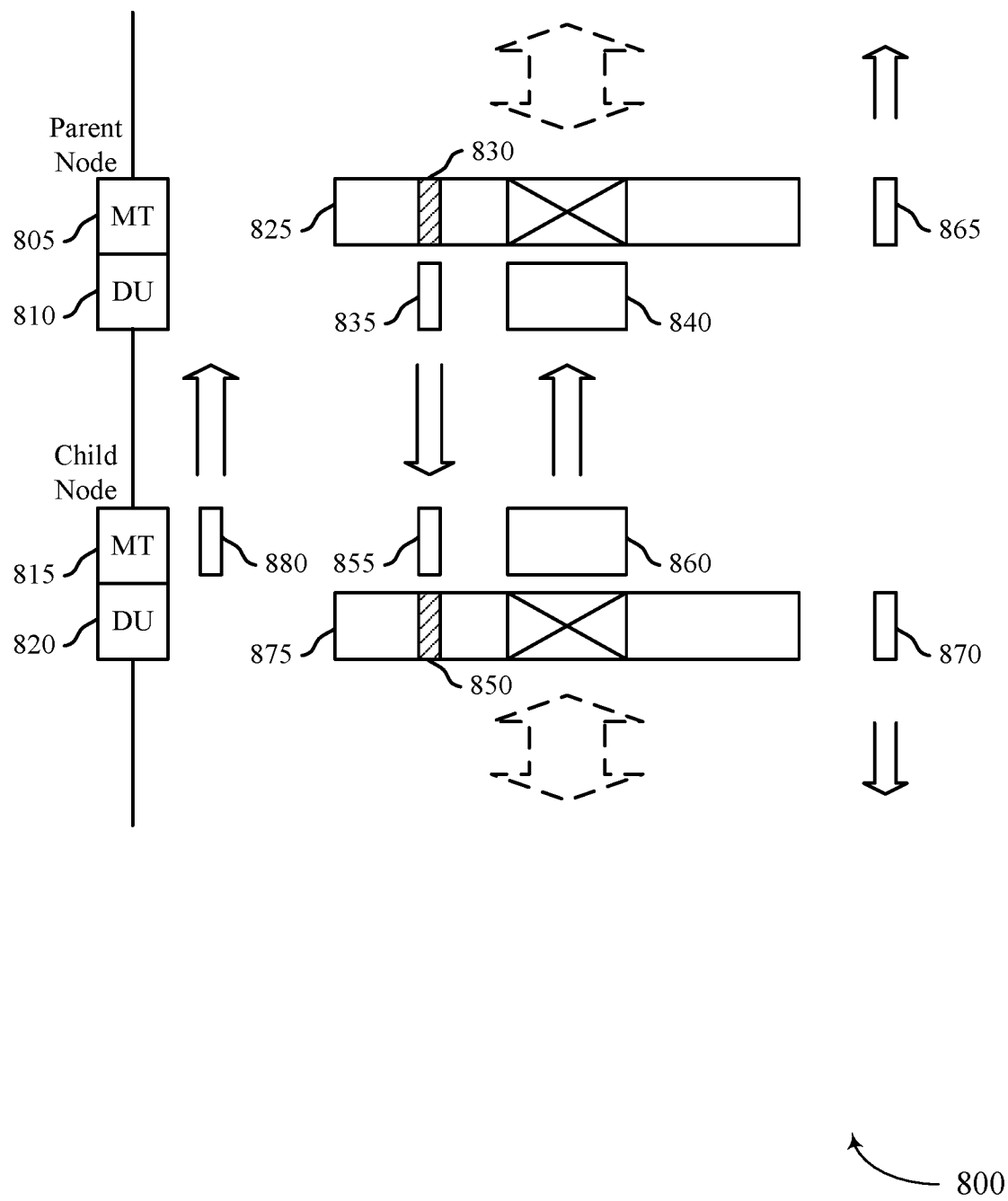
FIG. 8 illustrates an example of an IAB network that supports resource coordination for low-latency traffic in IAB in accordance with aspects of the present disclosure.

FIG. 8 illustrates an example of a IAB network 800 that supports resource coordination for low-latency traffic in IAB in accordance with aspects of the present disclosure. In some examples, IAB network 800 may implement aspects of wireless communications system 100, IAB networks 200, 300, 400 and/or 500, and/or processes 600 and/or 700. IAB network 800 may include a parent wireless node having an MT function 805 and a DU function 810, a child wireless node having a MT function 815 and a DU function 820. In some aspects, a parent wireless node refers to an IAB-donor or an IAB-node in an IAB-network, and a child wireless node refers to a child UE that are scheduled by the parent wireless node via parent DU interface or a child IAB-node whose MT interface is scheduled by the parent wireless node via parent DU interface.

Although only two wireless nodes are shown in IAB network 800, it is to be understood that more wireless nodes may be included in IAB network 800. Moreover, it is also to be understood that IAB network 800 may include an anchor wireless node (e.g., an IAB donor node) that has a link to a core network. In some aspects, the MT function 805 may be considered a second communication link interface and the DU function 810 may be considered a first communication link interface of the parent wireless node. Similarly, the MT function 815 may be considered a second communication link interface and the DU function 820 may be considered a first communication link interface of the child wireless node.

In some aspects, IAB network 800 may support URLLC services, e.g., communicating low latency traffic across one or more nodes of IAB network 800. In some aspects, this may include communicating traffic with an end-to-end latency for URLLC service classes of 1 ms, 10 ms, etc., by way of example. The reliability requirement for some URLLC service class can be as high as 10^5, 10^6, etc., by way of example. Technologies that may be implemented within IAB network 800 to support URLLC traffic may include, but are not limited to, flexible scheduling of a mini slot with [2, 4, 7] symbols, a specific CQI-to-MCS mapping for URLLC with very low target BLER, a downlink/uplink PI, an uplink configured grant, and the like.

In some aspects, there may be a problem with respect to communicating low latency traffic across IAB network 800 using conventional techniques. For example, difficulties using conventional techniques may include the case where a non-ideal DU function resource type alignment occurs between the IAB wireless nodes over scheduled resources. An ideal DU resource type alignment over scheduled resources may include the DU function 810 of the parent wireless node being configured with a hard/soft+ resource type with the MT function 815 of the child wireless node being configured with an N/A/soft− resource type. In this alignment, the DU function 810 may simply allocate the necessary resources for transmitting the low latency communications downstream and/or upstream. However, there may be non-ideal resource type alignment scenarios that introduces excessive delays in communicating low latency traffic according to conventional techniques. Examples of such non-ideal resource type alignment between the DU function 810 of a parent wireless node and the MT function 815 of the child wireless node may include, but are not limited to, hard/soft+ with N/A/soft+, N/A/soft− with hard/soft+, N/A/soft− with N/A/soft−, and the like. Accordingly, aspects of the described techniques may be beneficial to handle the case with non-ideal DU function resource type alignment between IAB nodes over scheduled resources.

Aspects of the described techniques may include a DCI grant (e.g., a dynamic DCI grant) carrying or otherwise conveying a low latency indication (e.g., an indication that low latency communications are to be performed). In some aspects, the DCI grant may indicate that low latency communications are to be performed so that an IAB node (e.g., such as the parent and/or child wireless node) may take different actions (e.g., modifying, overriding, etc.) for low latency traffic from normal traffic on scheduled resources upon receipt of the DCI grant. In order for the IAB node to take special action on scheduled resources upon reception of the DCI grant indicating low latency communications, the scheduling gap between the PDCCH and the PDSCH/PUSCH may be higher than the PDCCH decoding time.

In some aspects, the indication of the low latency communications in the DCI may be carried explicitly in the DCI grant using an optional field and/or implicitly carried or otherwise conveyed by a particular MCS, e.g., MCS-C-RNTI. In some aspects, MCS-C-RNTI may be used to indicate the use of an MCS table with a very low target BLER, which may be likely associated with URLLC traffic (e.g., low latency communications). In some aspects, the DCI grant may carry additional information, such as resource information/coordination for the next hop. In some examples, the DCI grant may take some existing DCI format with an enhanced field or a new DCI format may be used.

Accordingly, the DU function 810 of the parent wireless node may determine that low latency communications are to be performed with the child wireless node. In some aspects, the DU function 810 of the parent wireless node may receive a scheduling request 880 from the child wireless node indicating that the low latency communications are to be performed. However, the MT function 805 of the parent wireless node may have an ongoing communication 825 (e.g., an ongoing transmission/reception at the parent wireless node MT function 805). In some aspects, IAB network 800 illustrates the example where the resource type alignment includes a previously configured N/A/soft− resource type at the DU function 810 with the MT function 815 of the child wireless node being previously configured with a hard/soft+ resource type.

In some aspects, the MT function 805 (e.g., the second communication link interface) and/or the DU function 810 (e.g., the first communication link interface) of the parent wireless node may modify the previously configured resource type for the DU function 810 based, at least in some aspects, on the low latency communications. In some aspects, this may include the parent wireless node determining to receive the URLLC packets using resources in the DU function 810 previously configured N/A/soft– resource type. In some aspects, this may include the parent wireless node overriding the expected behavior defined by the previously configured N/A/soft– resource type. When there is an ongoing communication at the MT function 805 of the parent wireless node (as is shown in IAB network 800), the MT function 805 may stop transmitting/receiving on the overlapping resources in order for the DU function 810 to use the resources for communicating the URLLC traffic (e.g., the low latency communications).

In some aspects, the child wireless node may determine that low latency communications are to be performed. For example, the child wireless node may receive low latency traffic from a grandchild wireless node (e.g., a wireless node downstream from the child wireless node) for relaying upstream. In another example, the child wireless node may identify information to be communicated having a latency requirement below a threshold. Accordingly, the MT function 815 of the child wireless node may transmit a scheduling request 880 to the DU function 810 of the parent wireless node. The scheduling request 880 may explicitly (e.g., in bit(s), field(s), etc.) and/or implicitly (e.g., identifying information associated with the low latency communications) indicate that the low latency communications are to be performed. The parent wireless node may determine that low latency communications are to be performed with the child wireless node based on the scheduling request 880.

A PDCCH occasion 830 may be configured in which the parent wireless node is configured as available for transmitting a DCI grant in the instance that low latency communications are to be performed. Accordingly, the MT function 805 may pause its ongoing communications 825 during the PDCCH occasion 830 to allow the DU function 810 to transmit a DCI grant 835 (e.g., an uplink DCI grant), in some situations. In this instance, the DU function 810 may determine that the low latency communications (e.g., URLLC traffic or any other communications having a latency requirement below a threshold) are to be performed with the child wireless node. For example, the DU function 810 may receive the scheduling request 880 indicating that low latency communications are to be performed.

As is discussed, the DCI grant 835 (e.g., the uplink grant) may explicitly indicate the low latency communications are to be performed (e.g., using a field in the grant to indicate the low latency indications) and/or implicitly using an RNTI in the grant (e.g., using an RNTI associated with low latency communications, such as an MCS-C-RNTI).

Subsequently, the MT function 815 of the child wireless node may transmit the low latency communications 860 to the parent wireless node using the resources identified in the DCI grant 855. As is indicated by the blocked out portion of ongoing communications 875, this may include at least a portion of the resources of the previously configured resource type (of the MT function 815 in this example). Accordingly, the MT function 815 may determine that the previously configured resource type includes resources that are restricted for the MT function 815 to use for communicating, but may override (e.g., modify) the previously configured resource type anyway in order to allocate resources for communicating the low latency communications 860. In some aspects, the DU function 820 of the child wireless node may transmit an interruption indication or message 870 to a downstream wireless node indicating that the ongoing communications 875 were interrupted, e.g., in response to the low latency communications. That is, the DU function 820 of the child wireless node may send a "DU interruption indication" on one or more interrupted symbols to the downstream wireless node of the child wireless node, e.g., to ensure efficient retransmission of the interrupted communications. In some aspects, the ongoing communications 875 may have been previously scheduled by a grandparent node and/or semi-statically configured by the CU function of the anchor IAB node.

As discussed, there may be a scheduling gap between transmission of the DCI grant 835 and the low latency communications 840 with the child wireless node. If the previously configured resource type of the DU function 820 of the child wireless node is a hard/soft+ resource type, the scheduling gap may be larger than the PDCCH decoding time. In this way, at the first allocated symbol for URLLC, the child wireless node may be aware of the URLLC allocation and may take special actions for transmission of the URLLC.

That is, the MT function 815 of the child wireless node may receive the DCI grant 855 from the parent wireless node indicating that low latency communications are to be performed. As discussed, in some examples the DCI grant 855 may carry or convey an indication identifying the resources for the low latency communications. In some aspects, the MT function 815 and/or the DU function 820 of the child wireless node may modify a previously configured resource type for the DU function 820 based at least in part on the low latency communications. That is, upon reception of the DCI grant 855 with the low latency indication, the child wireless node may grant a higher priority to the MT function 815 in order to use resources for the low latency communications 860 regardless of the previously configured resource type of the DU function 820. In the situation where the DU function 820 has a previously configured resource type of hard/soft+, the child wireless node may override the expected behavior defined by the hard/soft+ resource type. As is illustrated in IAB network 800, the DU function 820 may be performing ongoing communications 875. In some aspects, the MT function 815 of the child wireless node may be configured with a PDCCH occasion 850 in which MT function 815 of the child wireless node monitors for the DCI grant 855. In response to receiving the DCI grant 855, the ongoing communications 875 may be interrupted (e.g., the resources may be overridden) in order to support communication of the low latency communications 860. That is, if there is an ongoing communication 875 at the DU function 820 of the child wireless node, the DU function 820 may stop transmitting/receiving on the overlapping resources and give the MT function 815 priority to use the resources for transmitting the URLLC traffic (e.g., the low latency communications 860). The ongoing communications 875 may have been previously scheduled by a child DU function and/or semi-statically configured by the CU function of an IAB donor node. Accordingly, the child wireless node may override the resources, at least partial resources, of the ongoing communications 875 in order to communicate the low latency communications 860 with the parent wireless node.

In some aspects, the child wireless node may transmit an interruption message 870 (e.g., a DU preemption indication) on one or more of the interrupted symbols of the ongoing communications 875 to a grand-child node (e.g., the downstream wireless device that was participating in the ongoing communications 875). This may provide for the efficient decoding and/or HARQ combining at the downstream wireless node.

In the situation where the previously configured resource type of the DU function 820 is a N/A/soft– resource type, the MT function 815 may already have priority to use the resources over its parent's backhaul link. In this situation, the scheduling gap may be smaller than the PDCCH decoding time.

Figure 9:
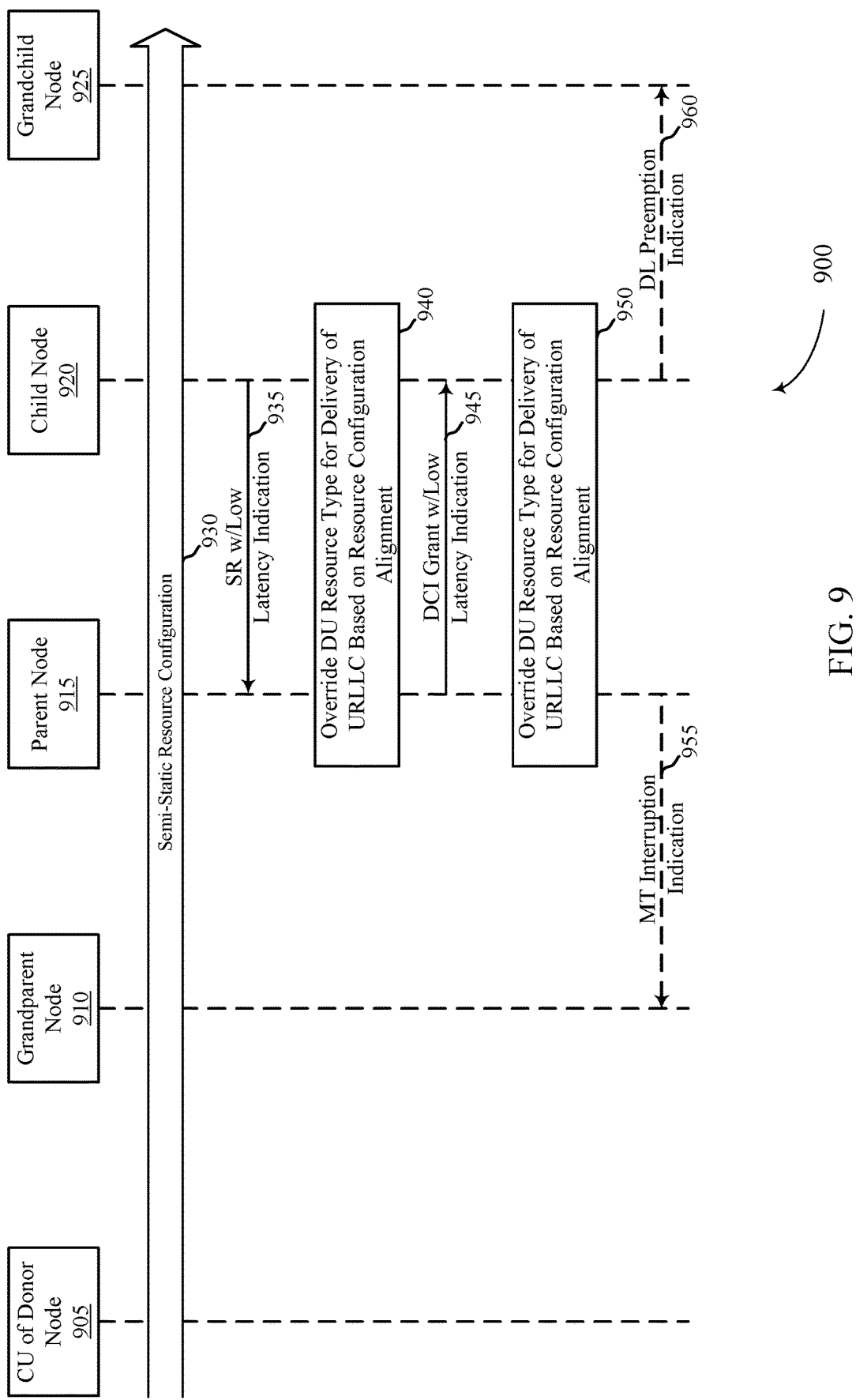
FIG. 9 illustrates an example of a process that supports resource coordination for low-latency traffic in IAB in accordance with aspects of the present disclosure.

FIG. 9 illustrates an example of a process 900 that supports resource coordination for low-latency traffic in IAB in accordance with aspects of the present disclosure. In some examples, process 900 may implement aspects of wireless communications system 100, IAB networks 200, 300, 400, 500, and/or 800, and/or processes 600 and/or 700. Aspects of process 900 may be implemented by a donor node 905, a grandparent wireless node 910, a parent wireless node 915, child wireless node 920, and/or a grandchild wireless node 925, which may be examples of the UE and/or a base station in an IAB network as described herein.

At 930, the donor node 905 (e.g., the CU function of donor node 905) may semi-statically configure resource types (e.g., previously configured resources) for the various nodes within the IAB network. For example, the donor node 905 may transmit various RRC messages and/or F1-AP messages from the donor node 905 in order to configure the resource types. In some aspects, these may constitute the configured resource types (e.g., a N/A resource type, a hard resource type, a soft resource type, etc.) for the respective nodes. In some aspects, the resource type configurations may be performed over an F1-AP interface, a Uu interface, and the like.

At 935, the child wireless node 920 may transmit or otherwise convey an indication of a scheduling request to the parent wireless node 915. For example, the child wireless node 920 may identify traffic to be communicated upstream that has a latency/requirement satisfying a threshold. The low latency communications may originate at the child wireless node 920 and/or the child wireless node 920 may be relaying low latency communications upstream from grandchild node 925 (or some other downstream node). In some aspects, the scheduling request may implicitly and/or explicitly indicate that the low latency communications are to be performed.

Although not shown in process 900, in some examples the parent wireless node 915 may transmit or otherwise provide (and the child wireless node 920 may receive) a grant (e.g., a DCI grant, uplink grant, etc.) carrying or conveying an indication that low latency communications are to be performed with the child wireless node 920. For example, the parent wireless node 915 may have determined that low latency communications having a latency below a threshold are to be performed with the child wireless node 920 based on the scheduling request. In some aspects, the grant may also carry or otherwise convey an indication of the resources being used to communicate the low latency communications. The resources may be for communicating the low latency communications between the parent wireless node 915 and the child wireless node 920 and/or may identify next-hop resources that can be used for the parent wireless node 920 to communicate the low latency communications upstream, e.g., to grandparent wireless node 910.

Accordingly and at 940, the parent wireless node 915 and/or the child wireless node 920 may modify, e.g., the DU function and/or the MT function of the parent wireless node 915 and/or the child wireless node 920, a previously configured resource type for the DU function in response to the low latency communications. That is, the DU functions and/or the MT functions of the parent wireless node 915 and/or the child wireless node 920 may modify the resource type that is configured at 930 in response to determining that the low latency communications are to be performed. In some aspects, this may include determining that at least one of the preconfigured resource types includes restricted resources in which the DU function and/or the MT function is not conventionally allowed to use. Regardless though, the DU function and/or MT function of the parent wireless node 915 and/or the child wireless node 920 may override at least a portion of the resources in the respective previously configured resource type.

At 945, this may include the parent wireless node 915 transmitting (and the child wireless node 920 receiving) a DCI grant (e.g., an uplink grant). The DCI grant may carry or otherwise convey an indication that the low latency communications are to be performed. In some aspects, the DCI grant may identify at least a portion of the resources (e.g., the modified or overwritten resources) for the low latency communications.

At 950, the parent wireless node 915 and/or the child wireless node 920 may modify, e.g., the DU function and/or the MT function of the parent wireless node 915 and/or the child wireless node 920, a previously configured resource type for the DU function in response to the low latency communications (e.g., based on the scheduling request and/or DCI grant). That is, the DU functions and/or the MT functions of the parent wireless node 915 and/or the child wireless node 920 may modify the resource type that is configured at 930 in response to determining that the low latency communications are to be performed.

In some aspects, this may include the parent wireless node 915 and/or the child wireless node 920 canceling, at least to some degree, ongoing communications between the parent wireless node 915 and the grandparent wireless node 910 and/or between the child wireless node 920 and the grandchild wireless node 925.

Accordingly and at 955, the parent wireless node 915 may transmit an MT interruption indication (e.g., in interruption message) to the grandparent wireless node 910. Similarly and at 960, the child wireless node 920 may transmit a DU preemption indication (e.g., and interruption message, such as a preemption indicator) to the grandchild wireless node 925.

Accordingly, aspects of the described techniques provide a mechanism whereby one or more wireless nodes within an IAB network may modify previously configured resource types that were otherwise restricted from modification in order to support communicating low latency communications within the IAB network.

Figure 10:
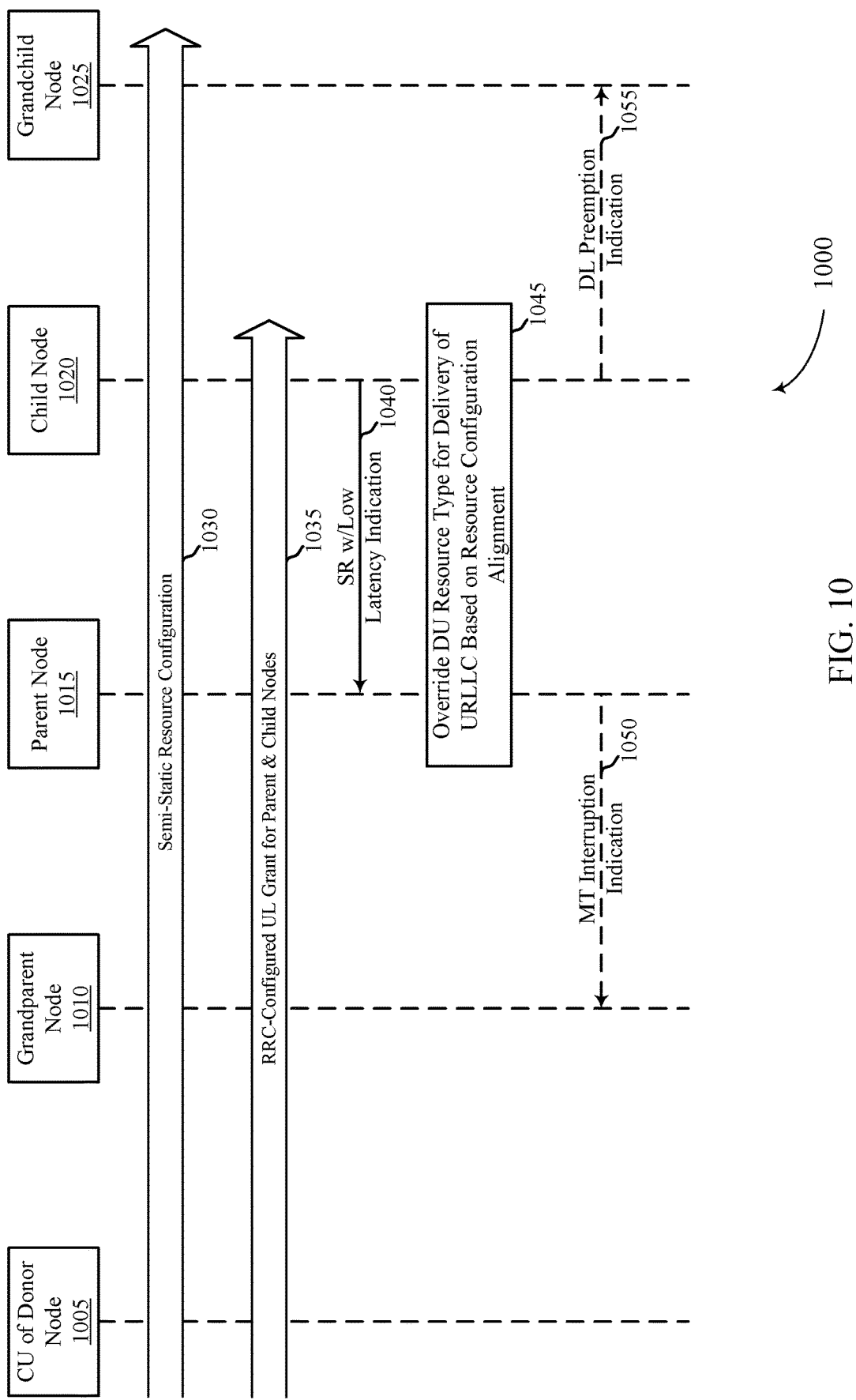
FIG. 10 illustrates an example of a process that supports resource coordination for low-latency traffic in IAB in accordance with aspects of the present disclosure.

FIG. 10 illustrates an example of a process 1000 that supports resource coordination for low-latency traffic in IAB in accordance with aspects of the present disclosure. In some examples, process 1000 may implement aspects of wireless communications system 100, IAB networks 200, 300, 400, 500, and/or 800, and/or processes 600, 700 and/or 900. Aspects of process 1000 may be implemented by a donor node 1005, a grandparent wireless node 1010, a parent wireless node 1015, child wireless node 1020, and/or a grandchild wireless node 1025, which may be examples of the UE and/or a base station in an IAB network as described herein.

At 1030, the donor node 1005 (e.g., the CU function of donor node 1005) may configure periodic or semi-static resource types (e.g., previously configured resources) for the various nodes within the IAB network. For example, the donor node 1005 may transmit various RRC messages and/or F1-AP messages from the donor node 1005 in order to configure the resource types. In some aspects, these may constitute the configured resource types (e.g., a N/A resource type, a hard resource type, a soft resource type, etc.) for the respective nodes. In some aspects, the resource type configurations may be performed over an F1-AP interface, a Uu interface, and the like.

At 1035, the donor node 1005 (e.g., the CU function of donor node 1005) may activate the configured periodic or semi-static resource types (e.g., previously configured resources) for the parent wireless node 1015 and the child wireless node 1020. For example, the donor node 1005 may transmit various RRC messages (e.g., an RRC-configured grant) activating the periodic or semi-static resources.

At 1040, the child wireless node 1020 may transmit or otherwise convey an indication of a scheduling request to the parent wireless node 1015. For example, the child wireless node 1020 may identify traffic to be communicated upstream that has a latency/requirement satisfying a threshold. The low latency communications may originate at the child wireless node 1020 and/or the child wireless node 1020 may be relaying low latency communications upstream from grandchild node 1025 (or some other downstream node). In some aspects, the scheduling request may implicitly and/or explicitly indicate that the low latency communications are to be performed.

Accordingly and at 1045, the parent wireless node 1015 and/or the child wireless node 1020 may modify, e.g., the DU function and/or the MT function of the parent wireless node 1015 and/or the child wireless node 1020, a previously configured resource type for the DU function in response to the low latency communications. That is, the DU functions and/or the MT functions of the parent wireless node 1015 and/or the child wireless node 1020 may modify the resource type that is configured at 1030 and activated by the RRC-configured grant at 1035 in response to determining that the low latency communications are to be performed. In some aspects, this may include determining that at least one of the preconfigured resource types includes restricted resources in which the DU function and/or the MT function is not conventionally allowed to use. Regardless though, the DU function and/or MT function of the parent wireless node 1015 and/or the child wireless node 1020 may override at least a portion of the resources in the respective previously configured resource type.

In some aspects, this may include the parent wireless node 1015 and/or the child wireless node 1020 canceling, at least to some degree, ongoing communications between the parent wireless node 1015 and the grandparent wireless node 910 and/or between the child wireless node 1020 and the grandchild wireless node 1025.

Accordingly and at 1055, the parent wireless node 1015 may transmit an MT interruption indication (e.g., in interruption message) to the grandparent wireless node 1010. Similarly and at 1060, the child wireless node 1020 may transmit a DU preemption indication (e.g., and interruption message, such as a preemption indicator) to the grandchild wireless node 1025.

Accordingly, aspects of the described techniques provide a mechanism whereby one or more wireless nodes within an IAB network may modify previously configured resource types that were otherwise restricted from modification in order to support communicating low latency communications within the IAB network.

Figure 11:
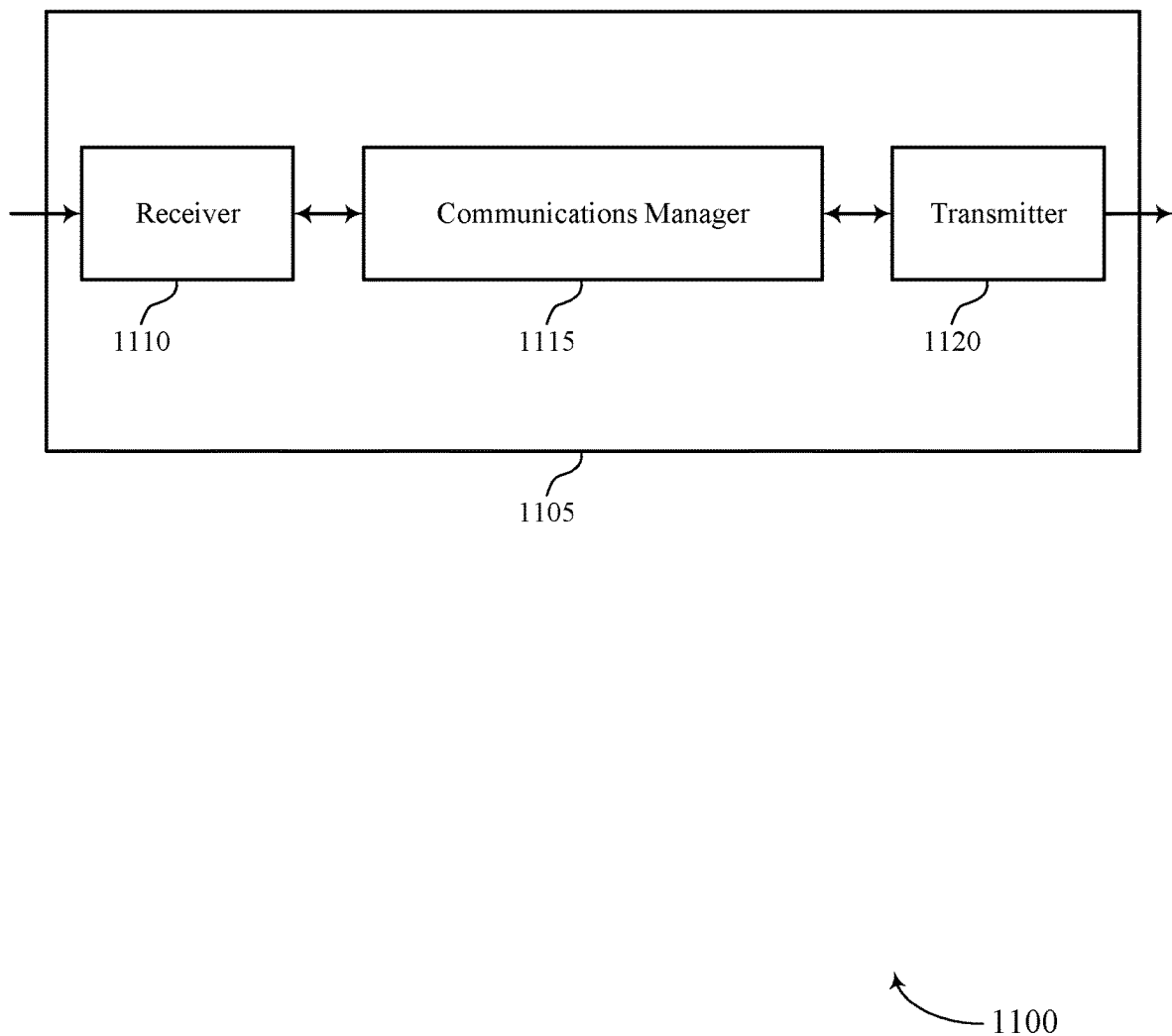
FIGS. 11 and 12 show block diagrams of devices that support resource coordination for low-latency traffic in IAB in accordance with aspects of the present disclosure.

FIG. 11 shows a block diagram 1100 of a device 1105 that supports resource coordination for low-latency traffic in IAB in accordance with aspects of the present disclosure. The device 1105 may be an example of aspects of a UE 115 or base station 105 as described herein. The device 1105 may include a receiver 1110, a communications manager 1115, and a transmitter 1120. The device 1105 may also include a processor. Each of these components may be in communication with one another (e.g., via one or more buses).

Receiver 1110 may receive information such as packets, user data, or control information associated with various information channels (e.g., control channels, data channels, and information related to resource coordination for low-latency traffic in IAB, etc.). Information may be passed on to other components of the device 1105. The receiver 1110 may be an example of aspects of the transceiver 1420 or 1520 as described with reference to FIGS. 14 and 15. The receiver 1110 may utilize a single antenna or a set of antennas.

The communications manager 1115 may determine that low latency communications having a latency below a threshold are to be performed with a child wireless node, modify, by at least one of the first communication link interface of the parent wireless node, or a second communication link interface of the parent wireless node that is different from the first communication link interface, or a combination thereof, a previously configured resource type for the first communication link interface based on the low latency communications, transmit, from the first communication link interface of the parent wireless node, a grant to the child wireless node indicating that the low latency communications are to be performed, and communicate, from the first communication link interface of the parent wireless node, the low latency communications with the child wireless node using resources identified in the grant, where the resource identified in the grant includes at least a portion of resources of the previously configured resource type. The communications manager 815 may also receive, by a second communication link interface of the child wireless node, a grant from a parent wireless node indicating that low latency communications are to be performed and identifying resources for the low latency communications, modify, by at least one of a first communication link interface of the child wireless node, or the second communication link interface of the child wireless link interface that is different from the first communication link interface, or a combination thereof, a previously configured resource type for the first communication link interface based on the low latency communications, and communicate the low latency communications with the parent wireless node using resource identified in the grant, where at least a portion of the resources identified in the grant include at least a portion of resources of the previously configured resource type.

The communications manager 1115 may receive, prior to a determination that low latency communications having a latency below a threshold are to be performed with a child wireless node, a configuration signal configuring periodic or semi-static resources; receive a scheduling request from the child wireless node, wherein the determination that low latency communications are to be performed is based at least in part on the scheduling request; modify a resource type associated with the periodic or semi-static resources for a first communication link interface based at least in part on the scheduling request; and communicate, from the first communication link interface of the parent wireless node, the low latency communications with the child wireless node using resources identified in a grant, wherein the resources identified in the grant comprise at least a portion of the periodic or semi-static resources based according to the modified resource type. The communications manager 815 may also receive, prior to a determination that low latency communications having a latency below a threshold are to be performed with a child wireless node, a configuration signal configuring periodic or semi-static resources; receive a scheduling request from the child wireless node, wherein the determination that low latency communications are to be performed is based at least in part on the scheduling request; modify a resource type associated with the periodic or semi-static resources for a first communication link interface based at least in part on the scheduling request; and communicate, from the first communication link interface of the parent wireless node, the low latency communications with the child wireless node using resources identified in a grant, wherein the resources identified in the grant comprise at least a portion of the periodic or semi-static resources based according to the modified resource type.

The communications manager 1115 may be an example of aspects of the communications manager 1410 or 1510 as described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 or 1520 as described with reference to FIGS. 14 and 15. The transmitter 1120 may utilize a single antenna or a set of antennas.

Figure 12:
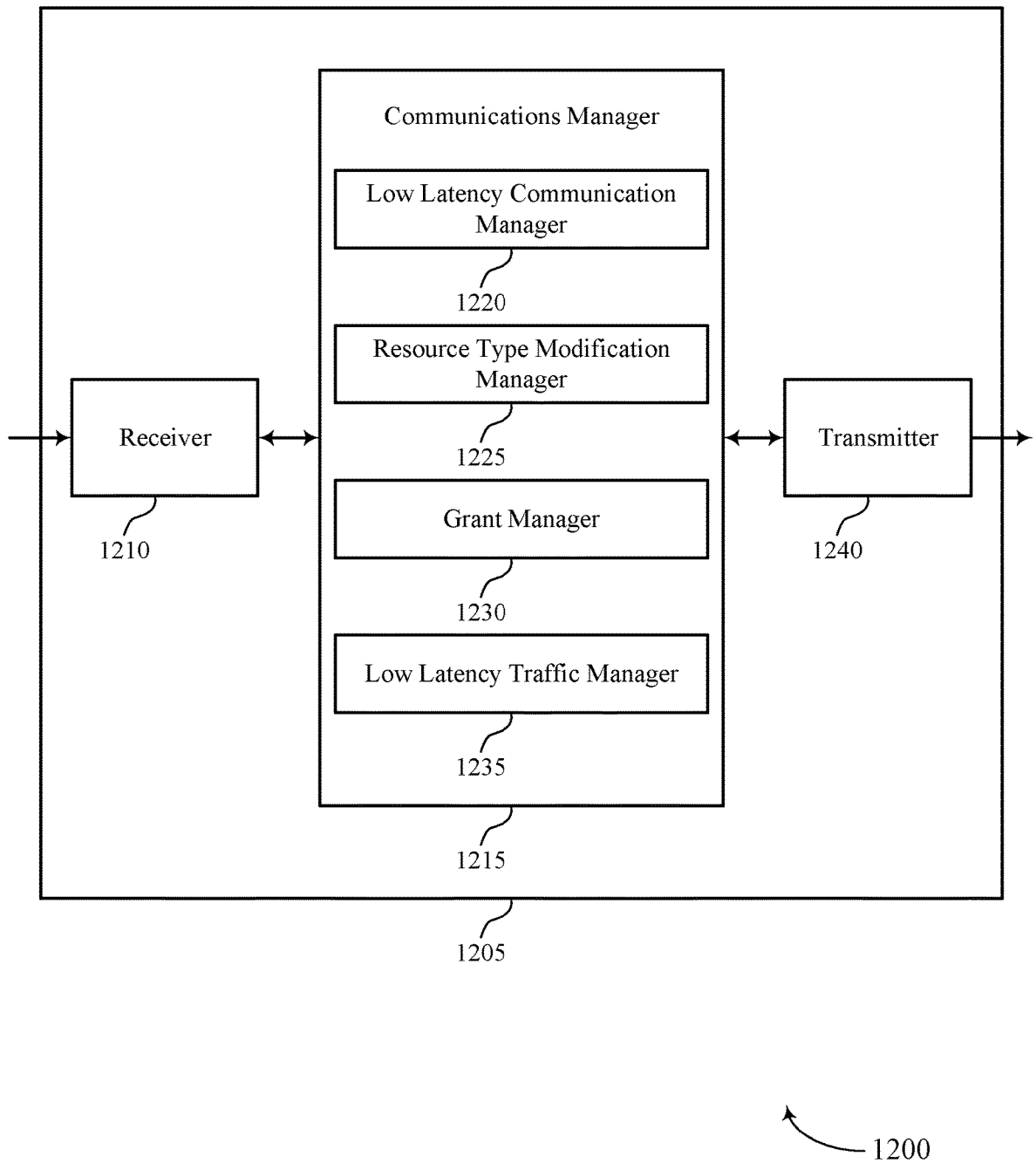

FIG. 12 shows a block diagram 1200 of a device 1205 that supports resource coordination for low-latency traffic in IAB in accordance with aspects of the present disclosure. The device 1205 may be an example of aspects of a device 1205, a UE 115, or a base station 105 as described herein. The device 1205 may include a receiver 1210, a communications manager 1215, and a transmitter 1240. The device 1205 may also include a processor. Each of these components may be in communication with one another (e.g., via one or more buses).

Receiver 1210 may receive information such as packets, user data, or control information associated with various information channels (e.g., control channels, data channels, and information related to resource coordination for low-latency traffic in IAB, etc.). Information may be passed on to other components of the device 1205. The receiver 1210 may be an example of aspects of the transceiver 1420 or 1520 as described with reference to FIGS. 14 and 15. The receiver 1210 may utilize a single antenna or a set of antennas.

The communications manager 1215 may be an example of aspects of the communications manager 1115 as described herein. The communications manager 1215 may include a low latency communication manager 1220, a resource type modification manager 1225, a grant manager 1230, and a low latency traffic manager 1235. The communications manager 1215 may be an example of aspects of the communications manager 1410 or 1510 as described herein.

The low latency communication manager 1220 may determine that low latency communications having a latency below a threshold are to be performed with a child wireless node. The low latency communication manager 1220 may receive, prior to a determination that low latency communications having a latency below a threshold are to be performed with a child wireless node, a configuration signal configuring periodic or semi-static resources; and receive a scheduling request from the child wireless node, wherein the determination that low latency communications are to be performed is based at least in part on the scheduling request. The low latency communication manager 1220 may transmit a scheduling request to the parent wireless node, wherein the determination that low latency communications are to be performed is based at least in part on the scheduling request.

The resource type modification manager 1225 may modify, by at least one of the first communication link interface of the parent wireless node, or a second communication link interface of the parent wireless node that is different from the first communication link interface, or a combination thereof, a previously configured resource type for the first communication link interface based on the low latency communications. The resource type modification manager 1225 may modify a resource type associated with the periodic or semi-static resources for a first communication link interface based at least in part on the scheduling request. The resource type modification manager 1225 may modify, by at least one of a first communication link interface of the child wireless node, or a second communication link interface of the child wireless node that is different from the first communication link interface, or a combination thereof, a resource type associated with the periodic or semi-static resources for the first communication link interface based at least in part on the scheduling request.

The grant manager 1230 may transmit, from the first communication link interface of the parent wireless node, a grant to the child wireless node indicating that the low latency communications are to be performed.

The low latency traffic manager 1235 may communicate, from the first communication link interface of the parent wireless node, the low latency communications with the child wireless node using resources identified in the grant, where the resource identified in the grant includes at least a portion of resources of the previously configured resource type. The low latency traffic manager 1235 may communicate, from the first communication link interface of the parent wireless node, the low latency communications with the child wireless node using resources identified in a grant, wherein the resources identified in the grant comprise at least a portion of the periodic or semi-static resources based according to the modified resource type. The low latency traffic manager 1235 may communicate, from the first communication link interface of the child wireless node, the low latency communications with the parent wireless node using resources identified in a grant, wherein the resources identified in the grant comprise at least a portion of the periodic or semi-static resources based according to the modified resource type.

The grant manager 1230 may receive, by a second communication link interface of the child wireless node, a grant from a parent wireless node indicating that low latency communications are to be performed and identifying resources for the low latency communications.

The resource type modification manager 1225 may modify, by at least one of a first communication link interface of the child wireless node, or the second communication link interface of the child wireless link interface that is different from the first communication link interface, or a combination thereof, a previously configured resource type for the first communication link interface based on the low latency communications.

The low latency traffic manager 1235 may communicate the low latency communications with the parent wireless node using resource identified in the grant, where at least a portion of the resources identified in the grant include at least a portion of resources of the previously configured resource type.

Transmitter 1240 may transmit signals generated by other components of the device 805. In some examples, the transmitter 1240 may be collocated with a receiver 1210 in a transceiver module. For example, the transmitter 1240 may be an example of aspects of the transceiver 1420 or 1520 as described with reference to FIGS. 14 and 15. The transmitter 1240 may utilize a single antenna or a set of antennas.

Figure 13:
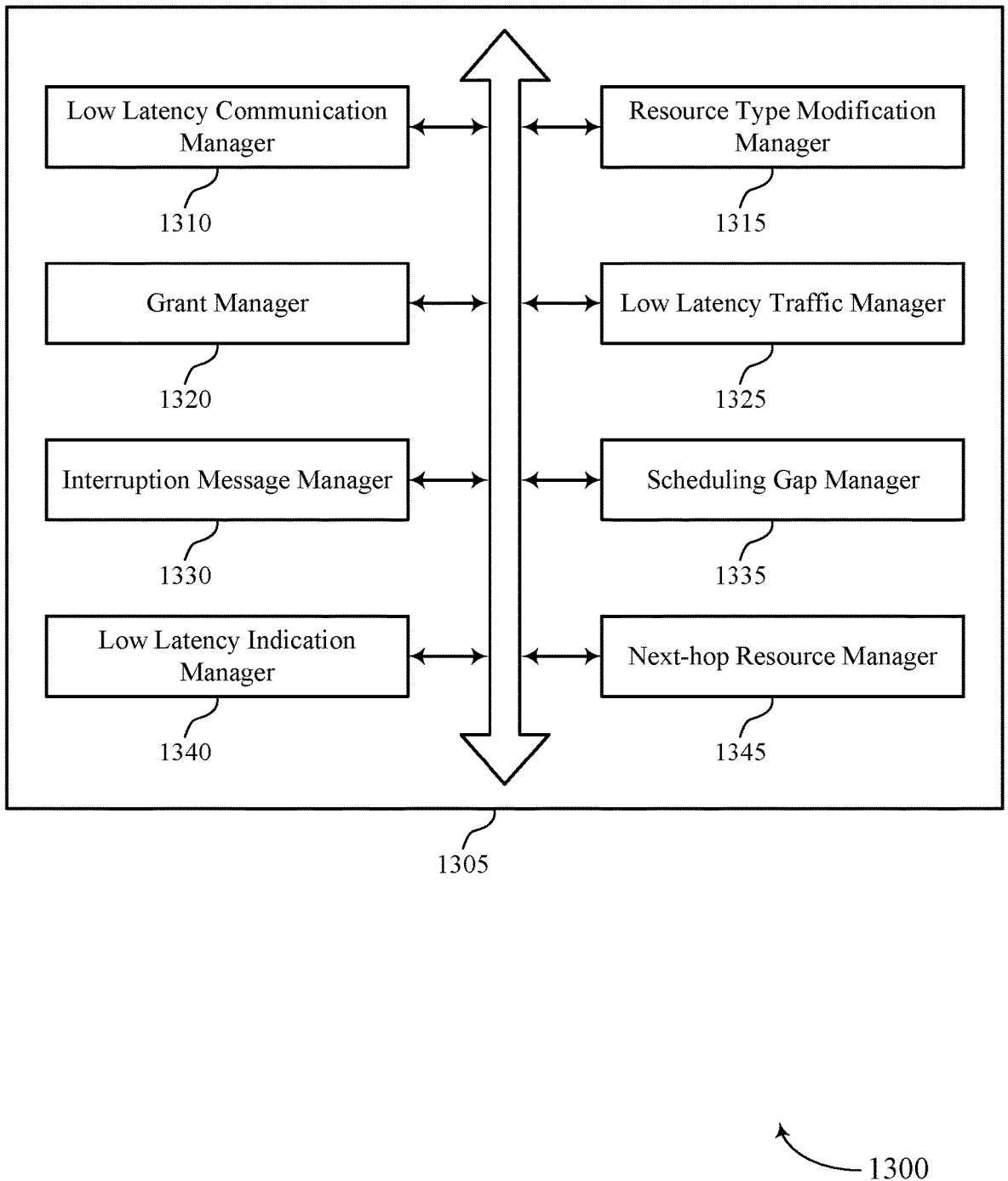
FIG. 13 shows a block diagram of a communications manager that supports resource coordination for low-latency traffic in IAB in accordance with aspects of the present disclosure.

FIG. 13 shows a block diagram 1300 of a communications manager 1305 that supports resource coordination for low-latency traffic in IAB in accordance with aspects of the present disclosure. The communications manager 1305 may be an example of aspects of a communications manager 1115, a communications manager 1215, or a communications manager 1410 described herein. The communications manager 1305 may include a low latency communication manager 1310, a resource type modification manager 1315, a grant manager 1320, a low latency traffic manager 1325, an interruption message manager 1330, a scheduling gap manager 1335, a low latency indication manager 1340, and a next-hop resource manager 1345. Each of these modules may communicate, directly or indirectly, with one another (e.g., via one or more buses).

The low latency communication manager 1310 may determine that low latency communications having a latency below a threshold are to be performed with a child wireless node. In some cases, the first communication link interface includes a distributed unit function of the parent wireless node, and the second communication link interface includes a mobile termination function of the parent wireless node. In some cases, the parent wireless node includes an IAB node. In some cases, the first communication link interface includes a distributed unit function of the child wireless node, and the second communication link interface includes a mobile termination function of the child wireless node. In some cases, the child wireless node includes an IAB node.

The low latency communication manager 1310 may receive, prior to a determination that low latency communications having a latency below a threshold are to be performed with a child wireless node, a configuration signal configuring periodic or semi-static resources; and receive a scheduling request from the child wireless node, wherein the determination that low latency communications are to be performed is based at least in part on the scheduling request. The low latency communication manager 1310 may transmit a scheduling request to the parent wireless node, wherein the determination that low latency communications are to be performed is based at least in part on the scheduling request.

The resource type modification manager 1315 may modify, by at least one of the first communication link interface of the parent wireless node, or a second communication link interface of the parent wireless node that is different from the first communication link interface, or a combination thereof, a previously configured resource type for the first communication link interface based on the low latency communications.

The resource type modification manager 1315 may modify a resource type associated with the periodic or semi-static resources for a first communication link interface based at least in part on the scheduling request. The resource type modification manager 1315 may modify, by at least one of a first communication link interface of the child wireless node, or a second communication link interface of the child wireless node that is different from the first communication link interface, or a combination thereof, a resource type associated with the periodic or semi-static resources for the first communication link interface based at least in part on the scheduling request.

In some examples, the resource type modification manager 1315 may modify, by at least one of a first communication link interface of the child wireless node, or the second communication link interface of the child wireless link interface that is different from the first communication link interface, or a combination thereof, a previously configured resource type for the first communication link interface based on the low latency communications. In some examples, determining that the previously configured resource type includes resources that are restricted for the first communication link interface to use for communicating with the child wireless node and are allocated for the second communication link interface to use for communicating with an upstream wireless node.

In some examples, the resource type modification manager 1315 may override, by the first communication link interface, the portion of the resources of the previously configured resource type to use for transmitting the grant and the low latency communications to the child wireless node. In some examples, the resource type modification manager 1315 may override (e.g., modify), by the second communication link interface, the portion of the resources of the previously configured resource type to cancel communicating with an upstream wireless node. In some examples, determining that the previously configured resource type includes resources that are restricted for the second communication link interface to use for communicating with the parent wireless node and are allocated for the first communication link interface to use for communicating with a downstream wireless node of the child wireless node.

In some examples, the resource type modification manager 1315 may override, by the second communication link interface, the portion of the resources of the previously configured resource type to use for receiving the grant and the low latency communications from the parent wireless node. In some examples, the resource type modification manager 1315 may override, by the first communication link interface, the portion of the resource of the previously configured resource type to cancel communicating with the downstream wireless node. In some cases, the previously configured resource type includes at least one of a not available resource type, or a soft resource type indicated as not available, or a combination thereof. In some cases, the previously configured resource type includes at least one of a hard resource type, or a soft resource type indicated as available, or a combination thereof.

The grant manager 1320 may transmit, from the first communication link interface of the parent wireless node, a grant to the child wireless node indicating that the low latency communications are to be performed. In some examples, the grant manager 1320 may receive, by a second communication link interface of the child wireless node, a grant from a parent wireless node indicating that low latency communications are to be performed and identifying resources for the low latency communications.

The low latency traffic manager 1325 may communicate, from the first communication link interface of the parent wireless node, the low latency communications with the child wireless node using resources identified in the grant, where the resource identified in the grant includes at least a portion of resources of the previously configured resource type. In some examples, the low latency traffic manager 1325 may communicate the low latency communications with the parent wireless node using resource identified in the grant, where at least a portion of the resources identified in the grant include at least a portion of resources of the previously configured resource type.

The low latency traffic manager 1325 may communicate, from the first communication link interface of the parent wireless node, the low latency communications with the child wireless node using resources identified in a grant, wherein the resources identified in the grant comprise at least a portion of the periodic or semi-static resources based according to the modified resource type. The low latency traffic manager 1325 may communicate, from the first communication link interface of the child wireless node, the low latency communications with the parent wireless node using resources identified in a grant, wherein the resources identified in the grant comprise at least a portion of the periodic or semi-static resources based according to the modified resource type.

The interruption message manager 1330 may transmit an interruption message to an upstream wireless node of the parent wireless node indicating that wireless communications using the portion of the resources of the previously configured resource type were interrupted. In some examples, the interruption message manager 1330 may transmit an interruption message to a downstream wireless node of the child wireless node indicating that wireless communications using the portion of the resources of the previously configured resource type were interrupted.

The scheduling gap manager 1335 may determine that a resource configuration of the child wireless node includes control channel resources used for transmitting the grant. In some examples, the scheduling gap manager 1335 may select, based on the control channel resources and a processing time of the child wireless node, a scheduling gap for communicating the low latency communications with the child wireless node, the scheduling gap including a time gap between transmitting the grant and communicating the low latency communications with the child wireless node.

The low latency indication manager 1340 may configure a field in the grant to indicate that the low latency communications are to be performed. In some examples, the low latency indication manager 1340 may select a RNTI associated with low latency communications for the grant to indicate that the low latency communications are to be performed. In some examples, the low latency indication manager 1340 may decode a field in the grant to identify the indication that the low latency communications are to be performed. In some examples, the low latency indication manager 1340 may decode a RNTI in the grant. In some examples, the low latency indication manager 1340 may determine that the grant indicates that the low latency communications are to be performed based on the RNTI being associated with low latency communications.

The next-hop resource manager 1345 may configure the grant to indicate next-hop resources for the child wireless node to forward the grant and the low latency communications to a grandchild wireless node of the parent wireless node.

Figure 14:
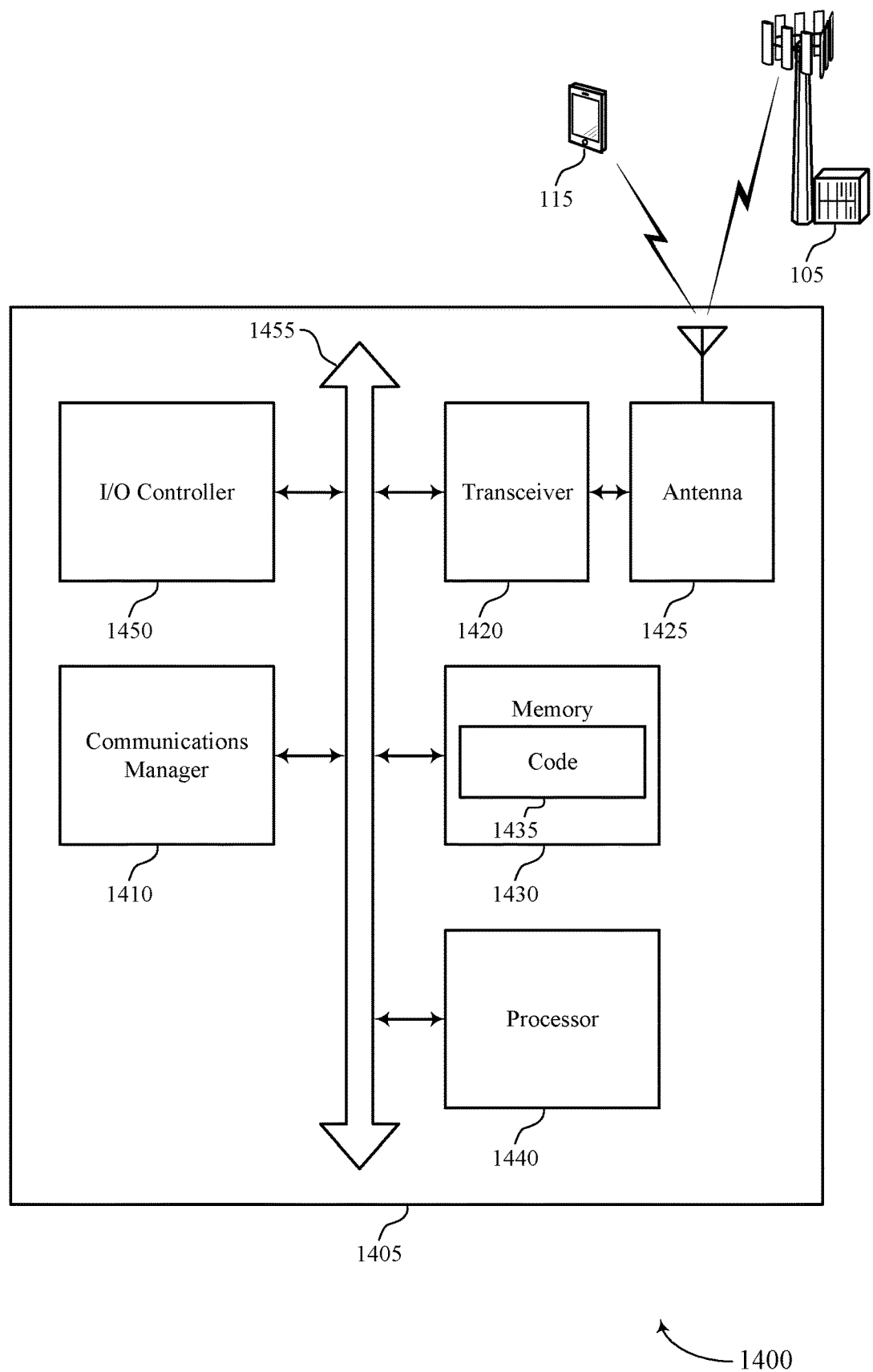
FIG. 14 shows a diagram of a system including a user equipment (UE) that supports resource coordination for low-latency traffic in IAB in accordance with aspects of the present disclosure.

FIG. 14 shows a diagram of a system 1400 including a device 1405 that supports resource coordination for low-latency traffic in IAB in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, a transceiver 1420, an antenna 1425, memory 1430, a processor 1440, and an I/O controller 1450. These components may be in electronic communication via one or more buses (e.g., bus 1455).

The communications manager 1410 may determine that low latency communications having a latency below a threshold are to be performed with a child wireless node, modify, by at least one of the first communication link interface of the parent wireless node, or a second communication link interface of the parent wireless node that is different from the first communication link interface, or a combination thereof, a previously configured resource type for the first communication link interface based on the low latency communications, transmit, from the first communication link interface of the parent wireless node, a grant to the child wireless node indicating that the low latency communications are to be performed, and communicate, from the first communication link interface of the parent wireless node, the low latency communications with the child wireless node using resources identified in the grant, where the resource identified in the grant includes at least a portion of resources of the previously configured resource type. The communications manager 1410 may also receive, by a second communication link interface of the child wireless node, a grant from a parent wireless node indicating that low latency communications are to be performed and identifying resources for the low latency communications, modify, by at least one of a first communication link interface of the child wireless node, or the second communication link interface of the child wireless link interface that is different from the first communication link interface, or a combination thereof, a previously configured resource type for the first communication link interface based on the low latency communications, and communicate the low latency communications with the parent wireless node using resource identified in the grant, where at least a portion of the resources identified in the grant include at least a portion of resources of the previously configured resource type.

The communications manager 1410 may receive, prior to a determination that low latency communications having a latency below a threshold are to be performed with a child wireless node, a configuration signal configuring periodic or semi-static resources; receive a scheduling request from the child wireless node, wherein the determination that low latency communications are to be performed is based at least in part on the scheduling request; modify a resource type associated with the periodic or semi-static resources for a first communication link interface based at least in part on the scheduling request; and communicate, from the first communication link interface of the parent wireless node, the low latency communications with the child wireless node using resources identified in a grant, wherein the resources identified in the grant comprise at least a portion of the periodic or semi-static resources based according to the modified resource type. The communications manager 1410 may also receive, prior to a determination that low latency communications having a latency below a threshold are to be performed with a child wireless node, a configuration signal configuring periodic or semi-static resources; receive a scheduling request from the child wireless node, wherein the determination that low latency communications are to be performed is based at least in part on the scheduling request; modify a resource type associated with the periodic or semi-static resources for a first communication link interface based at least in part on the scheduling request; and communicate, from the first communication link interface of the parent wireless node, the low latency communications with the child wireless node using resources identified in a grant, wherein the resources identified in the grant comprise at least a portion of the periodic or semi-static resources based according to the modified resource type.

Transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random access memory (RAM), read-only memory (ROM), or a combination thereof. The memory 1430 may store computer-readable code 1435 including instructions that, when executed by a processor (e.g., the processor 1440) cause the device to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting resource coordination for low-latency traffic in IAB).

The I/O controller 1450 may manage input and output signals for the device 1405. The I/O controller 1450 may also manage peripherals not integrated into the device 1405. In some cases, the I/O controller 1450 may represent a physical connection or port to an external peripheral. In some cases, the I/O controller 1450 may utilize an operating system such as iOS®, ANDROID®, MS-DOS®, MS-WINDOWS®, OS/2®, UNIX®, LINUX®, or another known operating system. In other cases, the I/O controller 1450 may represent or interact with a modem, a keyboard, a mouse, a touchscreen, or a similar device. In some cases, the I/O controller 1450 may be implemented as part of a processor. In some cases, a user may interact with the device 1405 via the I/O controller 1450 or via hardware components controlled by the I/O controller 1450.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
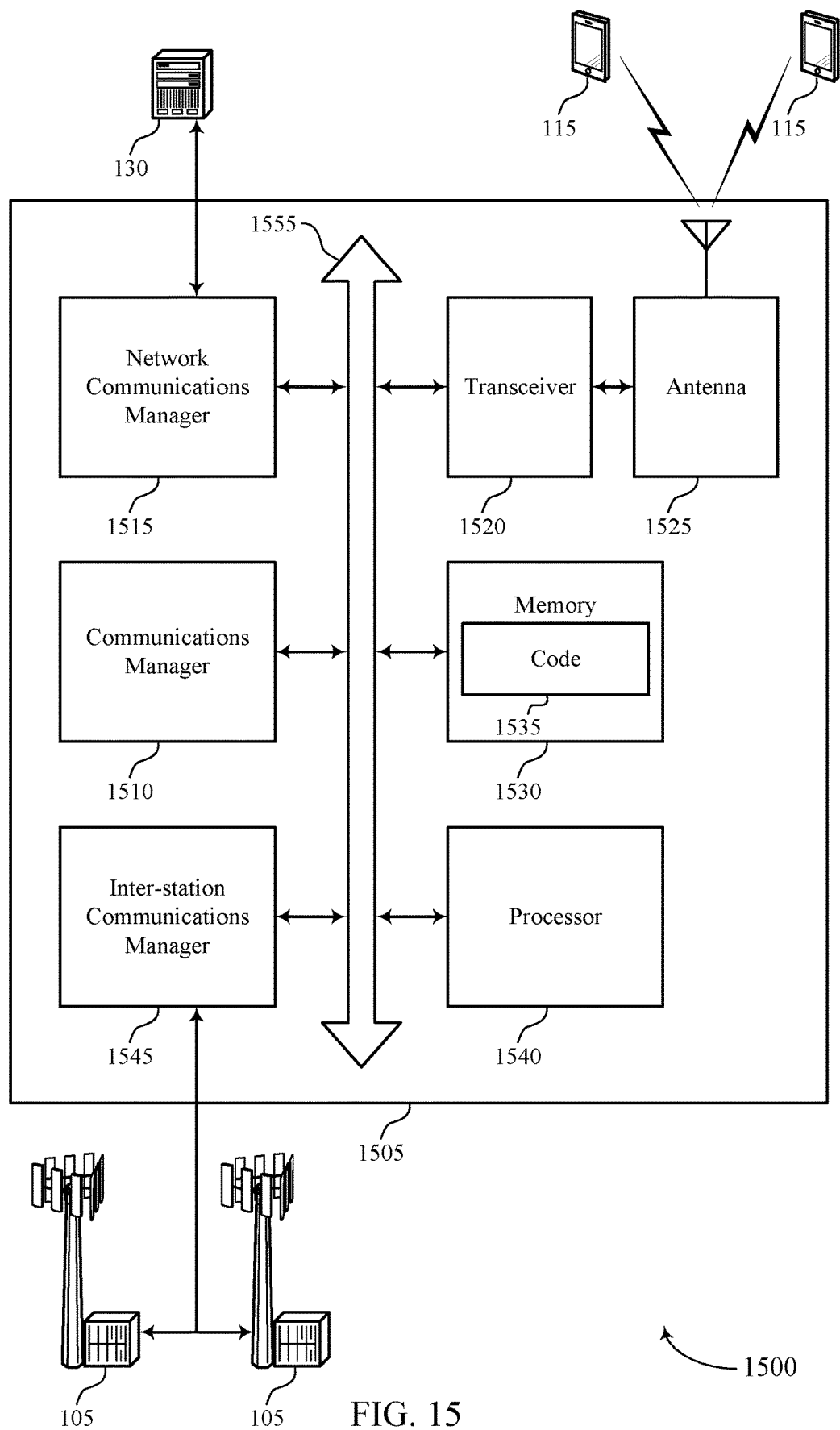
FIG. 15 shows a diagram of a system including a base station that supports resource coordination for low-latency traffic in IAB in accordance with aspects of the present disclosure.

FIG. 15 shows a diagram of a system 1500 including a device 1505 that supports resource coordination for low-latency traffic in IAB in accordance with aspects of the present disclosure. The device 1505 may be an example of or include the components of device 1105, device 1205, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1555).

The communications manager 1510 may determine that low latency communications having a latency below a threshold are to be performed with a child wireless node, modify, by at least one of the first communication link interface of the parent wireless node, or a second communication link interface of the parent wireless node that is different from the first communication link interface, or a combination thereof, a previously configured resource type for the first communication link interface based on the low latency communications, transmit, from the first communication link interface of the parent wireless node, a grant to the child wireless node indicating that the low latency communications are to be performed, and communicate, from the first communication link interface of the parent wireless node, the low latency communications with the child wireless node using resources identified in the grant, where the resource identified in the grant includes at least a portion of resources of the previously configured resource type. The communications manager 1510 may also receive, by a second communication link interface of the child wireless node, a grant from a parent wireless node indicating that low latency communications are to be performed and identifying resources for the low latency communications, modify, by at least one of a first communication link interface of the child wireless node, or the second communication link interface of the child wireless link interface that is different from the first communication link interface, or a combination thereof, a previously configured resource type for the first communication link interface based on the low latency communications, and communicate the low latency communications with the parent wireless node using resource identified in the grant, where at least a portion of the resources identified in the grant include at least a portion of resources of the previously configured resource type.

The communications manager 1510 may receive, prior to a determination that low latency communications having a latency below a threshold are to be performed with a child wireless node, a configuration signal configuring periodic or semi-static resources; receive a scheduling request from the child wireless node, wherein the determination that low latency communications are to be performed is based at least in part on the scheduling request; modify a resource type associated with the periodic or semi-static resources for a first communication link interface based at least in part on the scheduling request; and communicate, from the first communication link interface of the parent wireless node, the low latency communications with the child wireless node using resources identified in a grant, wherein the resources identified in the grant comprise at least a portion of the periodic or semi-static resources based according to the modified resource type. The communications manager 1510 may also receive, prior to a determination that low latency communications having a latency below a threshold are to be performed with a child wireless node, a configuration signal configuring periodic or semi-static resources; receive a scheduling request from the child wireless node, wherein the determination that low latency communications are to be performed is based at least in part on the scheduling request; modify a resource type associated with the periodic or semi-static resources for a first communication link interface based at least in part on the scheduling request; and communicate, from the first communication link interface of the parent wireless node, the low latency communications with the child wireless node using resources identified in a grant, wherein the resources identified in the grant comprise at least a portion of the periodic or semi-static resources based according to the modified resource type.

Network communications manager 1515 may manage communications with the core network (e.g., via one or more wired backhaul links). For example, the network communications manager 1515 may manage the transfer of data communications for client devices, such as one or more UEs 115.

Transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting resource coordination for low-latency traffic in IAB).

Inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
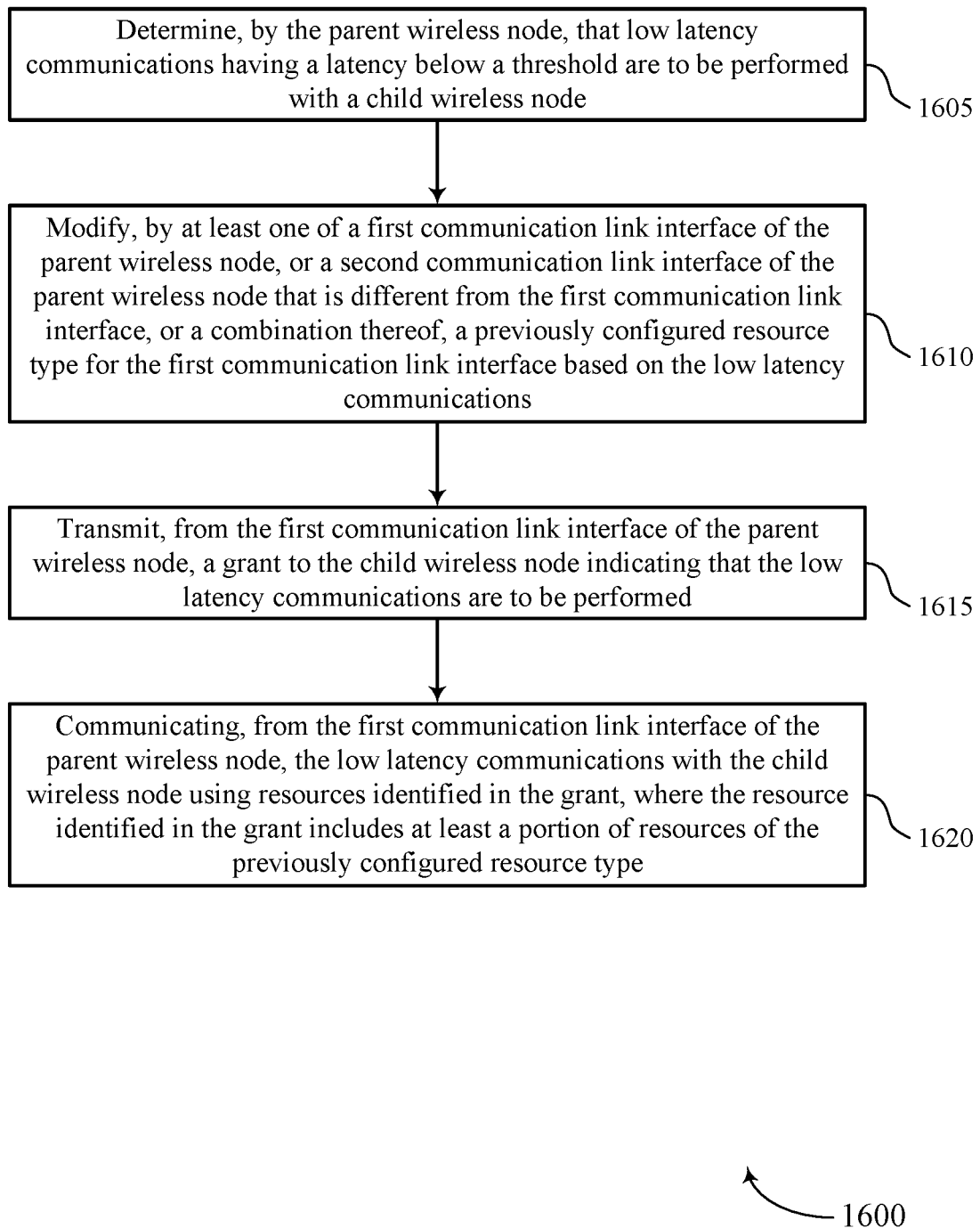
FIGS. 16 through 21 show flowcharts illustrating methods that support resource coordination for low-latency traffic in IAB in accordance with aspects of the present disclosure.

FIG. 16 shows a flowchart illustrating a method 1600 that supports resource coordination for low-latency traffic in IAB in accordance with aspects of the present disclosure. The operations of method 1600 may be implemented by a UE 115 or base station 105 or its components as described herein. For example, the operations of method 1600 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 1605, the parent wireless node may determine that low latency communications having a latency below a threshold are to be performed with a child wireless node. The operations of 1605 may be performed according to the methods described herein. In some examples, aspects of the operations of 1605 may be performed by a low latency communication manager as described with reference to FIGS. 11 through 15.

At 1610, the parent wireless node may modify, by at least one of the first communication link interface of the parent wireless node, or a second communication link interface of the parent wireless node that is different from the first communication link interface, or a combination thereof, a previously configured resource type for the first communication link interface based on the low latency communications. The operations of 1610 may be performed according to the methods described herein. In some examples, aspects of the operations of 1610 may be performed by a resource type modification manager as described with reference to FIGS. 11 through 15.

At 1615, the parent wireless node may transmit, from the first communication link interface of the parent wireless node, a grant to the child wireless node indicating that the low latency communications are to be performed. The operations of 1615 may be performed according to the methods described herein. In some examples, aspects of the operations of 1615 may be performed by a grant manager as described with reference to FIGS. 11 through 15.

At 1620, the parent wireless node may communicate, from the first communication link interface of the parent wireless node, the low latency communications with the child wireless node using resources identified in the grant, where the resource identified in the grant includes at least a portion of resources of the previously configured resource type. The operations of 1620 may be performed according to the methods described herein. In some examples, aspects of the operations of 1620 may be performed by a low latency traffic manager as described with reference to FIGS. 11 through 15.

Figure 17:
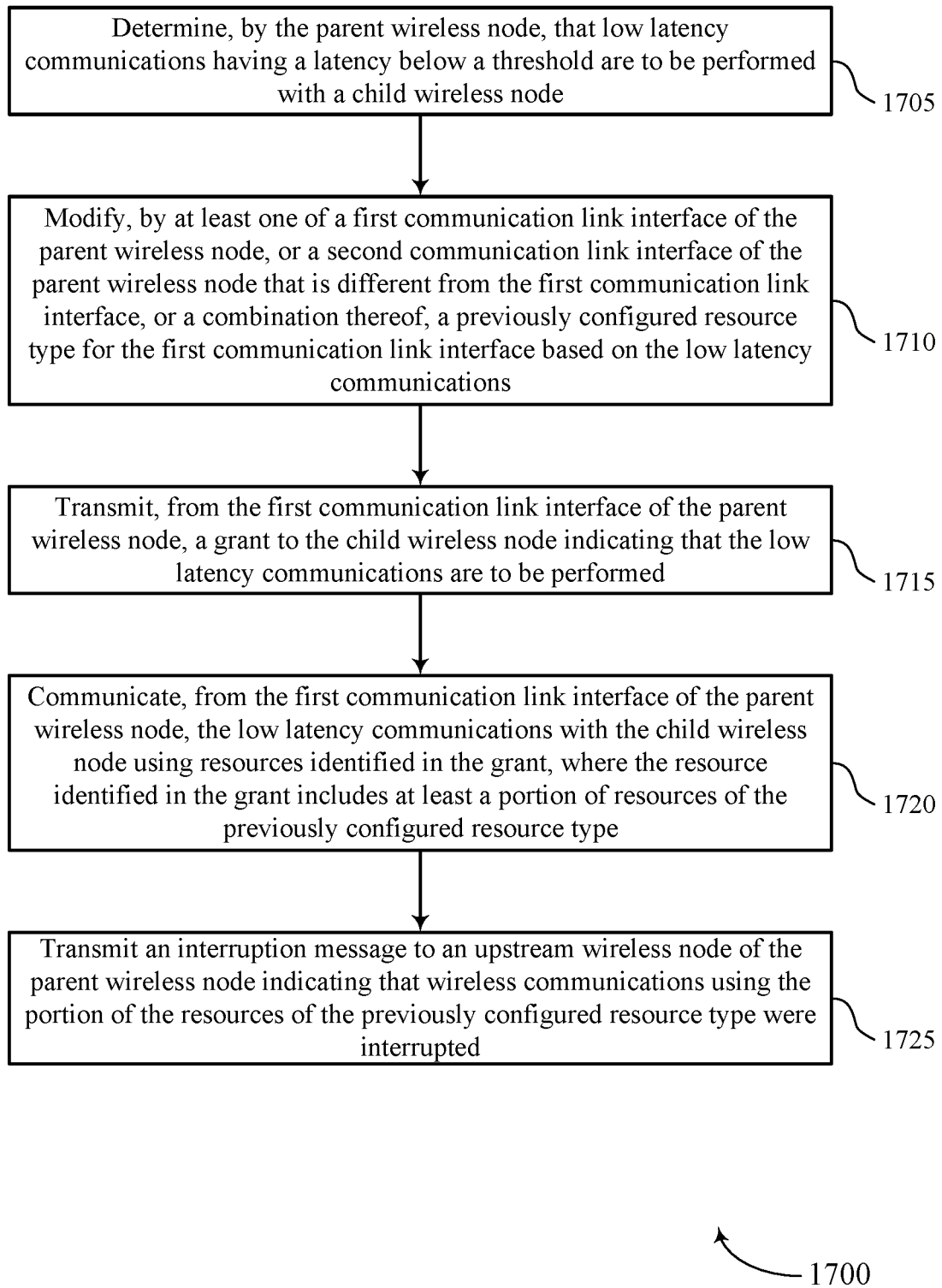

FIG. 17 shows a flowchart illustrating a method 1700 that supports resource coordination for low-latency traffic in IAB in accordance with aspects of the present disclosure. The operations of method 1700 may be implemented by a UE 115 or base station 105 or its components as described herein. For example, the operations of method 1700 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 1705, the parent wireless node may determine that low latency communications having a latency below a threshold are to be performed with a child wireless node. The operations of 1705 may be performed according to the methods described herein. In some examples, aspects of the operations of 1705 may be performed by a low latency communication manager as described with reference to FIGS. 11 through 15.

At 1710, the parent wireless node may modify, by at least one of the first communication link interface of the parent wireless node, or a second communication link interface of the parent wireless node that is different from the first communication link interface, or a combination thereof, a previously configured resource type for the first communication link interface based on the low latency communications. The operations of 1710 may be performed according to the methods described herein. In some examples, aspects of the operations of 1710 may be performed by a resource type modification manager as described with reference to FIGS. 11 through 15.

At 1715, the parent wireless node may transmit, from the first communication link interface of the parent wireless node, a grant to the child wireless node indicating that the low latency communications are to be performed. The operations of 1715 may be performed according to the methods described herein. In some examples, aspects of the operations of 1715 may be performed by a grant manager as described with reference to FIGS. 11 through 15.

At 1720, the parent wireless node may communicate, from the first communication link interface of the parent wireless node, the low latency communications with the child wireless node using resources identified in the grant, where the resource identified in the grant includes at least a portion of resources of the previously configured resource type. The operations of 1720 may be performed according to the methods described herein. In some examples, aspects of the operations of 1720 may be performed by a low latency traffic manager as described with reference to FIGS. 11 through 15.

At 1725, the parent wireless node may transmit an interruption message to an upstream wireless node of the parent wireless node indicating that wireless communications using the portion of the resources of the previously configured resource type were interrupted. The operations of 1725 may be performed according to the methods described herein. In some examples, aspects of the operations of 1725 may be performed by an interruption message manager as described with reference to FIGS. 11 through 15.

Figure 18:
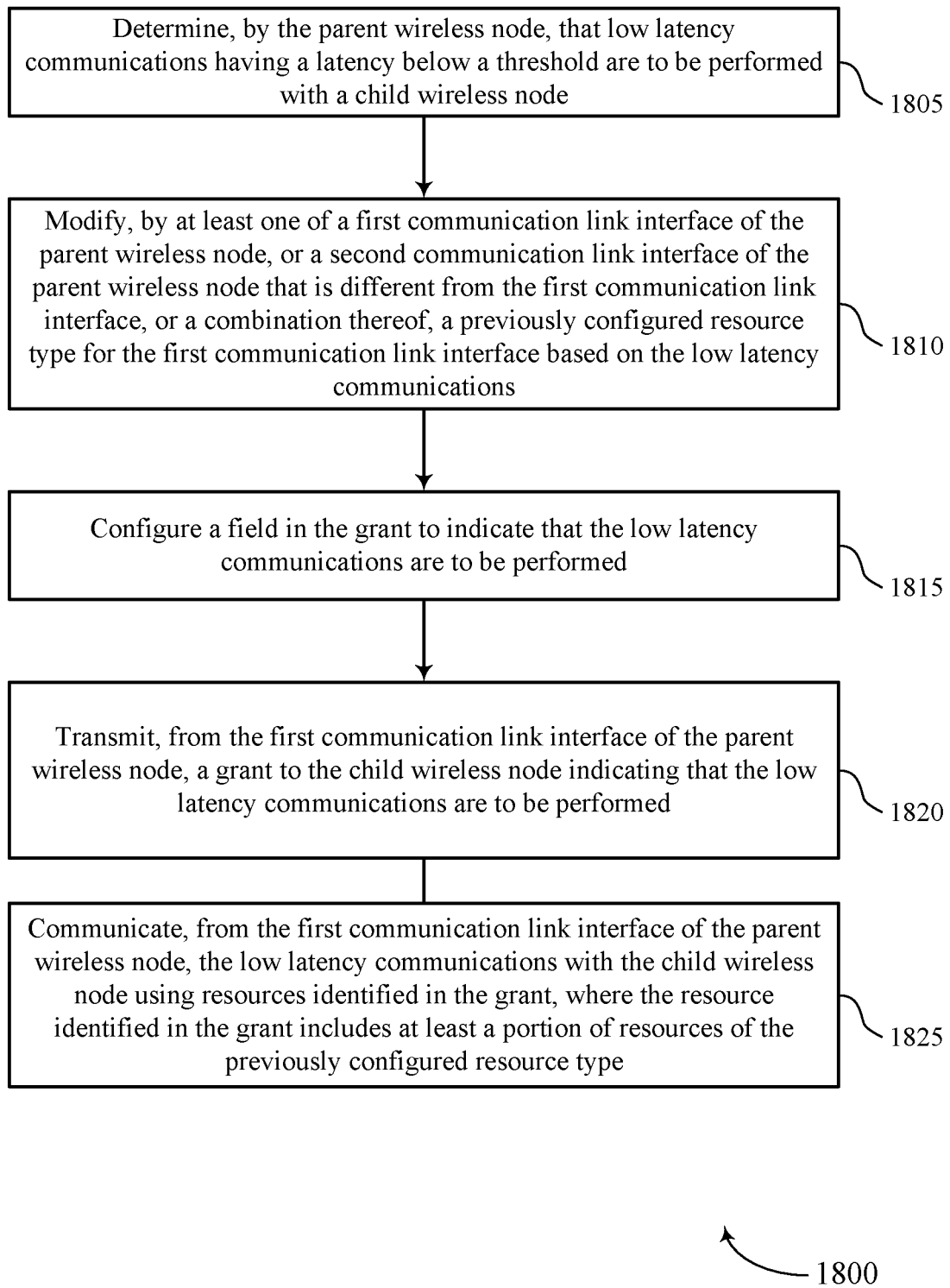

FIG. 18 shows a flowchart illustrating a method 1800 that supports resource coordination for low-latency traffic in IAB in accordance with aspects of the present disclosure. The operations of method 1800 may be implemented by a UE 115 or base station 105 or its components as described herein. For example, the operations of method 1800 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 1805, the parent wireless node may determine that low latency communications having a latency below a threshold are to be performed with a child wireless node. The operations of 1805 may be performed according to the methods described herein. In some examples, aspects of the operations of 1805 may be performed by a low latency communication manager as described with reference to FIGS. 11 through 15.

At 1810, the parent wireless node may modify, by at least one of the first communication link interface of the parent wireless node, or a second communication link interface of the parent wireless node that is different from the first communication link interface, or a combination thereof, a previously configured resource type for the first communication link interface based on the low latency communications. The operations of 1810 may be performed according to the methods described herein. In some examples, aspects of the operations of 1810 may be performed by a resource type modification manager as described with reference to FIGS. 11 through 15.

At 1815, the parent wireless node may configure a field in the grant to indicate that the low latency communications are to be performed. The operations of 1815 may be performed according to the methods described herein. In some examples, aspects of the operations of 1815 may be performed by a grant manager as described with reference to FIGS. 11 through 15.

At 1820, the parent wireless node may transmit, from the first communication link interface of the parent wireless node, a grant to the child wireless node indicating that the low latency communications are to be performed. The operations of 1820 may be performed according to the methods described herein. In some examples, aspects of the operations of 1820 may be performed by a low latency traffic manager as described with reference to FIGS. 11 through 15.

At 1825, the parent wireless node communicate, from the first communication link interface of the parent wireless node, the low latency communications with the child wireless node using resources identified in the grant, where the resource identified in the grant includes at least a portion of resources of the previously configured resource type. The operations of 1825 may be performed according to the methods described herein. In some examples, aspects of the operations of 1825 may be performed by a low latency indication manager as described with reference to FIGS. 11 through 15.

Figure 19:
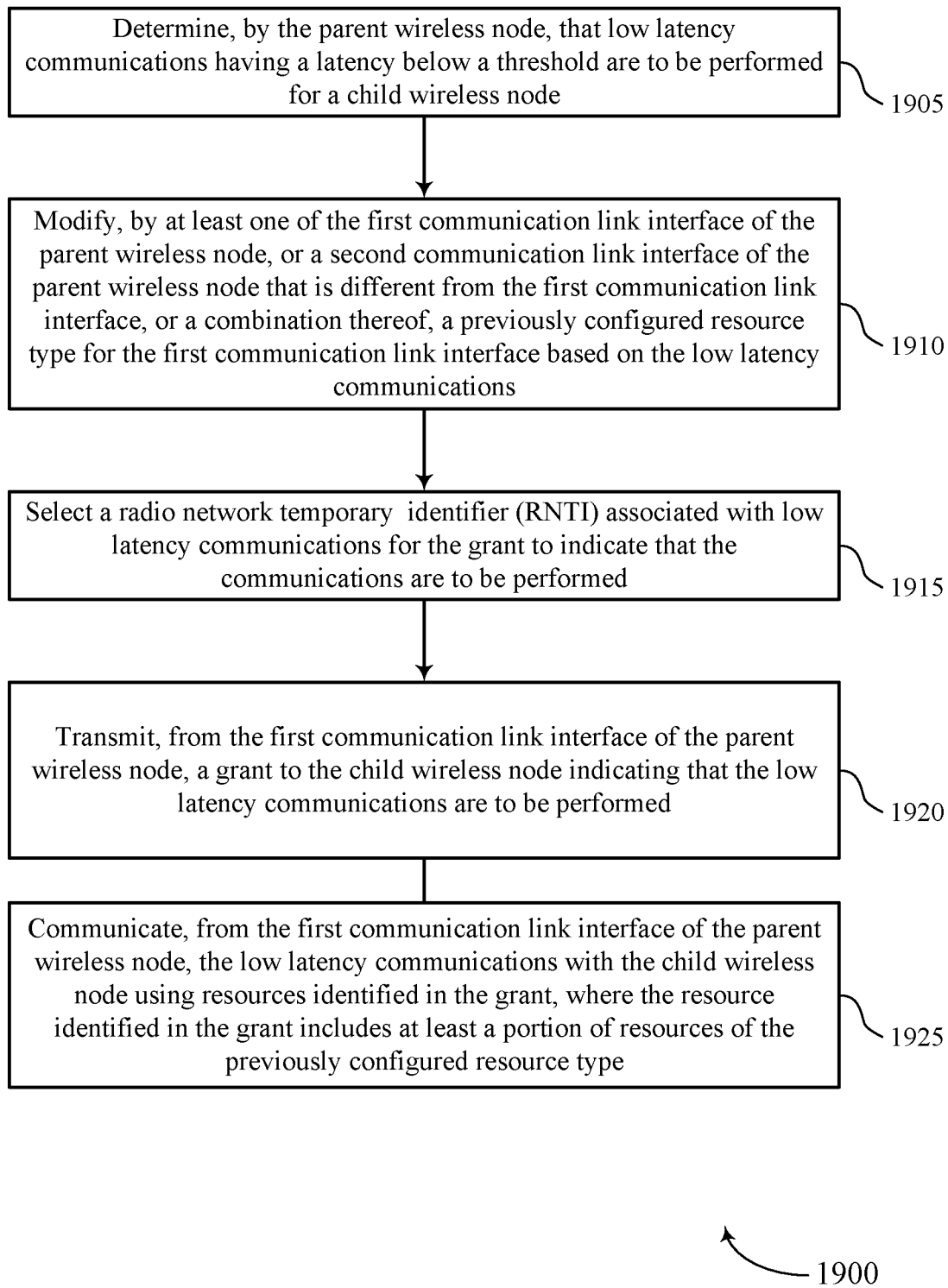

FIG. 19 shows a flowchart illustrating a method 1900 that supports resource coordination for low-latency traffic in IAB in accordance with aspects of the present disclosure. The operations of method 1900 may be implemented by a UE 115 or base station 105 or its components as described herein. For example, the operations of method 1900 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 1905, the parent wireless node may determine that low latency communications having a latency below a threshold are to be performed with a child wireless node. The operations of 1905 may be performed according to the methods described herein. In some examples, aspects of the operations of 1905 may be performed by a low latency communication manager as described with reference to FIGS. 11 through 15.

At 1910, the parent wireless node may modify, by at least one of the first communication link interface of the parent wireless node, or a second communication link interface of the parent wireless node that is different from the first communication link interface, or a combination thereof, a previously configured resource type for the first communication link interface based on the low latency communications. The operations of 1910 may be performed according to the methods described herein. In some examples, aspects of the operations of 1910 may be performed by a resource type modification manager as described with reference to FIGS. 11 through 15.

At 1915, the parent wireless node may select a radio network temporary identifier (RNTI) associated with low latency communications for the grant to indicate that the low latency communications are to be performed. The operations of 1915 may be performed according to the methods described herein. In some examples, aspects of the operations of 1915 may be performed by a grant manager as described with reference to FIGS. 11 through 15.

At 1920, the parent wireless node may transmit, from the first communication link interface of the parent wireless node, a grant to the child wireless node indicating that the low latency communications are to be performed. The operations of 1920 may be performed according to the methods described herein. In some examples, aspects of the operations of 1920 may be performed by a low latency traffic manager as described with reference to FIGS. 11 through 15.

At 1925, the parent wireless node may communicate, from the first communication link interface of the parent wireless node, the low latency communications with the child wireless node using resources identified in the grant, where the resource identified in the grant includes at least a portion of resources of the previously configured resource type. The operations of 1925 may be performed according to the methods described herein. In some examples, aspects of the operations of 1925 may be performed by a low latency indication manager as described with reference to FIGS. 11 through 15.

Figure 20:
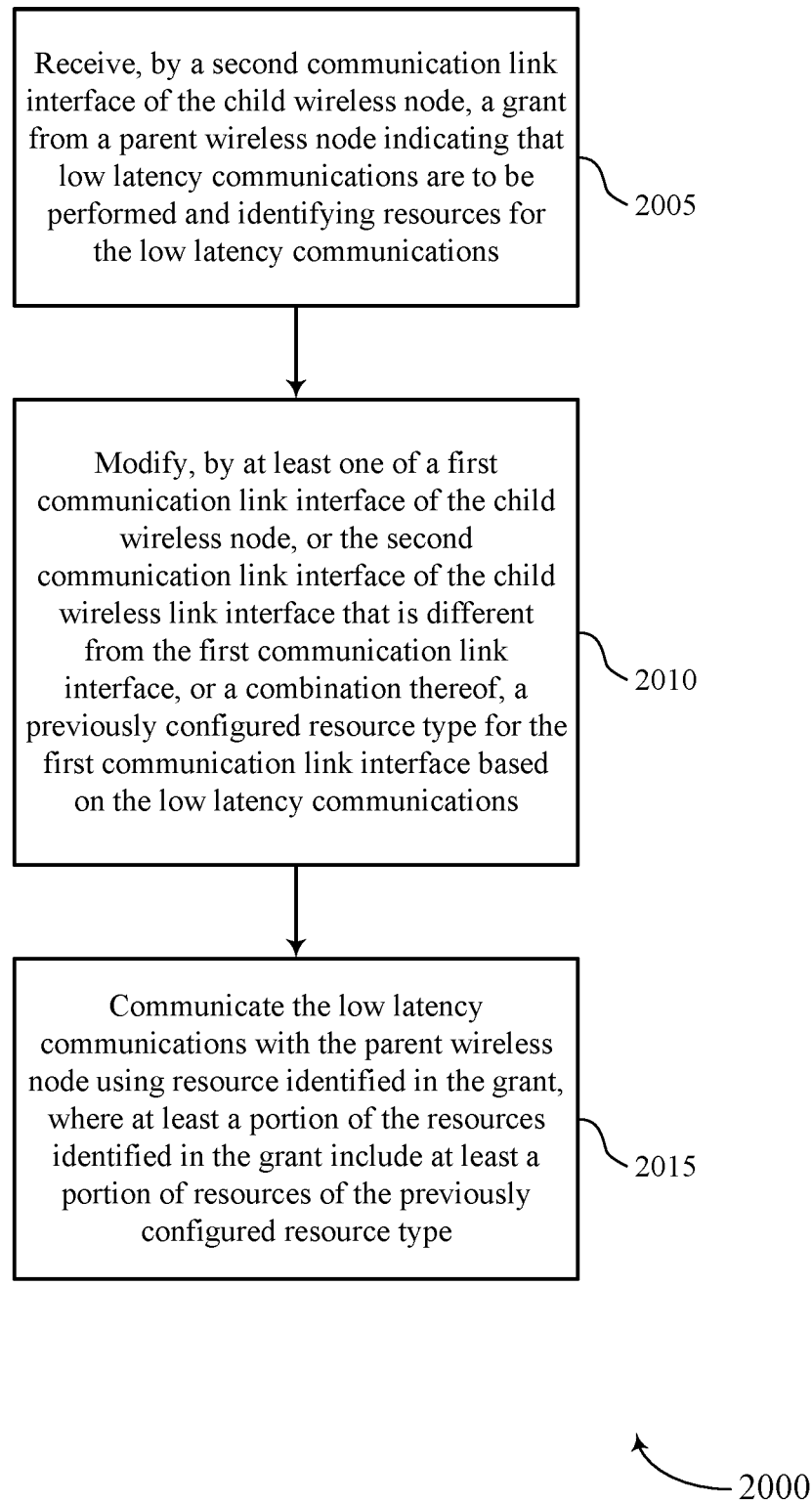

FIG. 20 shows a flowchart illustrating a method 2000 that supports resource coordination for low-latency traffic in IAB in accordance with aspects of the present disclosure. The operations of method 2000 may be implemented by a UE 115 or base station 105 or its components as described herein. For example, the operations of method 2000 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 2005, the child wireless node may receive, by a second communication link interface of the child wireless node, a grant from a parent wireless node indicating that low latency communications are to be performed and identifying resources for the low latency communications. The operations of 2005 may be performed according to the methods described herein. In some examples, aspects of the operations of 2005 may be performed by a grant manager as described with reference to FIGS. 11 through 15.

At 2010, the UE or base station may modify, by at least one of a first communication link interface of the child wireless node, or the second communication link interface of the child wireless link interface that is different from the first communication link interface, or a combination thereof, a previously configured resource type for the first communication link interface based on the low latency communications. The operations of 2010 may be performed according to the methods described herein. In some examples, aspects of the operations of 2010 may be performed by a resource type modification manager as described with reference to FIGS. 11 through 15.

At 2015, the child wireless node may communicate the low latency communications with the parent wireless node using resource identified in the grant, where at least a portion of the resources identified in the grant include at least a portion of resources of the previously configured resource type. The operations of 2015 may be performed according to the methods described herein. In some examples, aspects of the operations of 2015 may be performed by a low latency traffic manager as described with reference to FIGS. 11 through 15.

Figure 21:
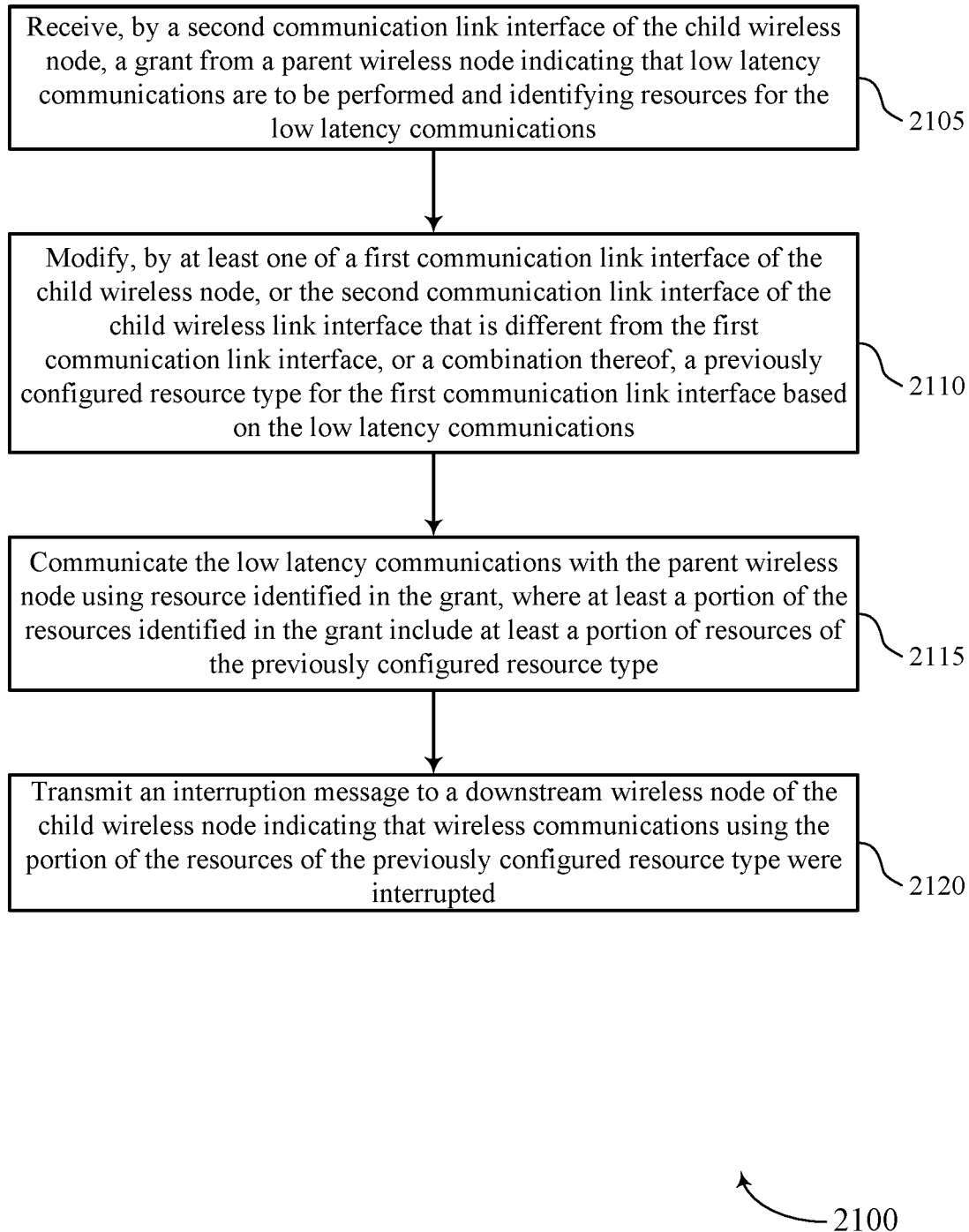

FIG. 21 shows a flowchart illustrating a method 2100 that supports resource coordination for low-latency traffic in IAB in accordance with aspects of the present disclosure. The operations of method 2100 may be implemented by a UE 115 or base station 105 or its components as described herein. For example, the operations of method 2100 may be performed by a communications manager as described with reference to FIGS. 11 through 15. In some examples, a UE or base station may execute a set of instructions to control the functional elements of the UE or base station to perform the functions described below. Additionally or alternatively, a UE or base station may perform aspects of the functions described below using special-purpose hardware.

At 2105, the child wireless node may receive, by a second communication link interface of the child wireless node, a grant from a parent wireless node indicating that low latency communications are to be performed and identifying resources for the low latency communications. The operations of 2105 may be performed according to the methods described herein. In some examples, aspects of the operations of 2105 may be performed by a grant manager as described with reference to FIGS. 11 through 15.

At 2110, the child wireless node may modify, by at least one of a first communication link interface of the child wireless node, or the second communication link interface of the child wireless link interface that is different from the first communication link interface, or a combination thereof, a previously configured resource type for the first communication link interface based on the low latency communications. The operations of 2110 may be performed according to the methods described herein. In some examples, aspects of the operations of 2110 may be performed by a resource type modification manager as described with reference to FIGS. 11 through 15.

At 2115, the child wireless node may communicate the low latency communications from the parent wireless node using resource identified in the grant, where at least a portion of the resources identified in the grant include at least a portion of resources of the previously configured resource type. The operations of 2115 may be performed according to the methods described herein. In some examples, aspects of the operations of 2115 may be performed by a low latency traffic manager as described with reference to FIGS. 11 through 15.

At 2120, the child wireless node may transmit an interruption message to a downstream wireless node of the child wireless node indicating that wireless communications using the portion of the resources of the previously configured resource type were interrupted. The operations of 2120 may be performed according to the methods described herein. In some examples, aspects of the operations of 2120 may be performed by an interruption message manager as described with reference to FIGS. 11 through 15.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein. Thus, example 1 is a method for wireless communication at a parent wireless node, comprising: determining that low latency communications having a latency below a threshold are to be performed with a child wireless node; modifying, by at least one of the first communication link interface of the parent wireless node, or a second communication link interface of the parent wireless node that is different from the first communication link interface, or a combination thereof, a previously configured resource type for the first communication link interface based at least in part on the low latency communications; transmitting, from the first communication link interface of the parent wireless node, a grant to the child wireless node indicating that the low latency communications are to be performed; and communicating, from the first communication link interface of the parent wireless node, the low latency communications with the child wireless node using resources identified in the grant, wherein the resource identified in the grant comprises at least a portion of resources of the modified previously configured resource type.

In example 2, the method of example 1 may include wherein modifying the previously configured resource type comprises: determining that the previously configured resource type comprises resources that are restricted for the first communication link interface to use for communicating with the child wireless node and are allocated for the second communication link interface to use for communicating with an upstream wireless node; overriding, by the first communication link interface, the portion of the resources of the previously configured resource type to use for transmitting the grant and the low latency communications to the child wireless node; and overriding, by the second communication link interface, the portion of the resources of the previously configured resource type to cancel communicating with an upstream wireless node.

In example 3, the method of examples 1-2 may include wherein the previously configured resource type comprises at least one of a not available resource type, or a soft resource type indicated as not available, or a combination thereof.

In example 4, the method of examples 1-3 may include transmitting an interruption message to an upstream wireless node of the parent wireless node indicating that wireless communications using the portion of the resources of the previously configured resource type were interrupted.

In example 5, the method of examples 1-4 may include determining that a resource configuration of the child wireless node comprises control channel resources used for transmitting the grant; and selecting, based at least in part on the control channel resources and a processing time of the child wireless node, a scheduling gap for communicating the low latency communications with the child wireless node, the scheduling gap comprising a time gap between transmitting the grant and communicating the low latency communications with the child wireless node.

In example 6, the method of examples 1-5 may include: configuring a field in the grant to indicate that the low latency communications are to be performed.

In example 7, the method of examples 1-6 may include: selecting a RNTI associated with low latency communications for the grant to indicate that the communications are to be performed.

In example 8, the method of examples 1-7 may include: configuring the grant to indicate next-hop resources for the child wireless node to forward the grant and the low latency communications to a grandchild wireless node of the parent wireless node.

In example 9, the method of examples 1-8 wherein the first communication link interface comprises a distributed unit function of the parent wireless node, and the second communication link interface comprises a mobile termination function of the parent wireless node.

In example 10, the method of examples 1-9 may include wherein the parent wireless node comprises an IAB node.

Example 11 is a method for wireless communications at a child wireless node, comprising: receiving, by a second communication link interface of the child wireless node, a grant from a parent wireless node indicating that low latency communications are to be performed and identifying resources for the low latency communications; modifying, by at least one of a first communication link interface of the child wireless node, or the second communication link interface of the child wireless link interface that is different from the first communication link interface, or a combination thereof, a previously configured resource type for the first communication link interface based at least in part on the low latency communications; and receiving the low latency communications from the parent wireless node using resource identified in the grant, wherein at least a portion of the resources identified in the grant comprise at least a portion of resources of the previously configured resource type.

In example 12, the method of example 11 may include: determining that the previously configured resource type comprises resources that are restricted for the second communication link interface to use for communicating with the parent wireless node of the parent wireless node and are allocated for the first communication link interface to use for communicating with a downstream wireless node of the child wireless node; overriding, by the second communication link interface, the portion of the resources of the previously configured resource type to use for receiving the grant and the low latency communications from the parent wireless node; and overriding, by the first communication link interface, the portion of the resource of the previously configured resource type to cancel communicating with the downstream wireless node.

In example 13, the method of examples 11-12 may include wherein the previously configured resource type comprises at least one of a hard resource type, or a soft resource type indicated as available, or a combination thereof.

In example 14, the method of examples 11-13 may include: transmitting an interruption message to a downstream wireless node of the child wireless node indicating that wireless communications using the portion of the resources of the previously configured resource type were interrupted.

In example 15, the method of examples 11-14 may include: decoding a field in the grant to identify the indication that the low latency communications are to be performed.

In example 16, the method of examples 11-15 may include: decoding a RNTI in the grant; and determining that the grant indicates that the low latency communications are to be performed based at least in part on the RNTI being associated with low latency communications.

In example 17, the method of examples 11-16 may include wherein the first communication link interface comprises a distributed unit function of the child wireless node, and the second communication link interface comprises a mobile termination function of the child wireless node.

In example 18, the method of examples 11-17 may include wherein the child wireless node comprises an IAB node.

Example 19 is a method for wireless communications at a parent wireless node comprising: receiving, prior to a determination that low latency communications having a latency below a threshold are to be performed with a child wireless node, a configuration signal configuring periodic or semi-static resources; receiving a scheduling request from the child wireless node, wherein the determination that low latency communications are to be performed is based at least in part on the scheduling request; modifying a resource type associated with the periodic or semi-static resources for a first communication link interface based at least in part on the scheduling request; and communicating, from the first communication link interface of the parent wireless node, the low latency communications with the child wireless node using resources identified in a grant, wherein the resources identified in the grant comprise at least a portion of the periodic or semi-static resources based according to the modified resource type.

In example 20, the method of example 19 may include wherein the scheduling request indicates that the low latency communications are to be performed.

In example 21, the method of examples 19-20 may include determining that the resource type associated with the periodic or semi-static resources comprises resources that are restricted for the first communication link interface to use for communicating with the child wireless node and are allocated for a second communication link interface to use for communicating with an upstream wireless node; overriding, by the first communication link interface, a portion of the resources of the resource type to use for the low latency communications to the child wireless node; and overriding, by a second communication link interface, a portion of the resources of the resource type to cancel communicating with the upstream wireless node.

In example 22, the method of examples 19-21 may include wherein the resource type associated with the periodic or semi-static resources comprises at least one of a not available resource type, or a soft resource type indicated as not available, or a combination thereof.

In example 23, the method of examples 19-22 may include transmitting an interruption message to an upstream wireless node of the parent wireless node indicating that wireless communications using the portion of the resources of the resource type were interrupted.

In example 24, the method of examples 19-23 may include wherein the first communication link interface comprises a distributed unit function of the parent wireless node, and a second communication link interface comprises a mobile termination function of the parent wireless node.

In example 25, the method of examples 19-24 may include wherein the parent wireless node comprises an integrated access and backhaul node.

Example 30 is a method for wireless communications at a child wireless node comprising: receiving, prior to a determination that low latency communications having a latency below a threshold are to be performed with a parent wireless node, a configuration signal configuring periodic or semi-static resources; transmitting a scheduling request to the parent wireless node, wherein the determination that low latency communications are to be performed is based at least in part on the scheduling request; modifying, by at least one of a first communication link interface of the child wireless node, or a second communication link interface of the child wireless node that is different from the first communication link interface, or a combination thereof, a resource type associated with the periodic or semi-static resources for the first communication link interface based at least in part on the scheduling request; and communicating, from the first communication link interface of the child wireless node, the low latency communications with the parent wireless node using resources identified in a grant, wherein the resources identified in the grant comprise at least a portion of the periodic or semi-static resources based according to the modified resource type.

In example 31, the method of example 30 may include wherein the scheduling request indicates that the low latency communications are to be performed.

In example 32, the method of examples 30-31 may include determining that the resource type associated with the periodic or semi-static resources comprises resources that are restricted for the first communication link interface to use for communicating with the parent wireless node and are allocated for the second communication link interface to use for communicating with an upstream wireless node; overriding, by the first communication link interface, a portion of the resources of the resource type to use for performing the low latency communications with the parent wireless node; and overriding, by the second communication link interface, a portion of the resources of the resource type to cancel communicating with the upstream wireless node.

In example 33, the method of examples 30-32 may include wherein the resource type associated with the periodic or semi-static resources comprises at least one of a not available resource type, or a soft resource type indicated as not available, or a combination thereof.

In example 34, the method of examples 30-33 may include transmitting an interruption message to a downstream wireless node of the child wireless node indicating that wireless communications using the portion of the resources of the resource type were interrupted.

In example 35, the method of examples 30-34 may include wherein the first communication link interface comprises a distributed unit function of the child wireless node, and a second communication link interface comprises a mobile termination function of the child wireless node.

In example 36, the method of examples 30-35 may include wherein the child wireless node comprises an integrated access and backhaul node.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a parent wireless node, comprising:
   determining that low latency communications having a latency below a threshold are to be performed with a child wireless node;
   overriding, autonomously by at least one of a first communication link interface of the parent wireless node, or a second communication link interface of the parent wireless node that is different from the first communication link interface, or a combination thereof, a previously configured resource type for the first communication link interface based at least in part on the low latency communications, wherein the previously configured resource type comprises an unavailable resource type for time and frequency resources where the time and frequency resources are restricted for use by the first communication link interface to an available resource type where the time and frequency resources are available for use by the first communication link interface, and wherein the previously configured resource type comprises at least one of a not available resource type, or a soft resource type indicated as not available, or a combination thereof;
   transmitting, from the first communication link interface of the parent wireless node, a grant to the child wireless node indicating that the low latency communications are to be performed; and
   communicating, from the first communication link interface of the parent wireless node, the low latency communications with the child wireless node using resources identified in the grant, wherein the resources identified in the grant comprises at least a portion of the time and frequency resources of the overridden previously configured resource type.

2. The method of claim 1, further comprising:
   receiving a scheduling request from the child wireless node, wherein determining that low latency communications to be performed is based at least in part on the scheduling request; and
   overriding the previously configured resource type for the first communication link interface based at least in part on the scheduling request.

3. The method of claim 2, wherein the scheduling request indicates that the low latency communications are to be performed.

4. The method of claim 1, wherein overriding the previously configured resource type comprises:
   determining that the previously configured resource type comprises the time and frequency resources that are restricted for the first communication link interface to use for communicating with the child wireless node and are available for the second communication link interface to use for communicating with an upstream wireless node;
   overriding, by the first communication link interface of the parent wireless node, a portion of the time and frequency resources of the previously configured resource type to use for transmitting the grant and the low latency communications to the child wireless node; and
   overriding, by the second communication link interface of the parent wireless node, the portion of the time and frequency resources of the previously configured resource type to cancel communicating with the upstream wireless node.

5. The method of claim 1, further comprising:
   transmitting an interruption message to an upstream wireless node of the parent wireless node indicating that wireless communications using the portion of the time and frequency resources of the previously configured resource type were interrupted.

6. The method of claim 1, further comprising:
   determining that a resource configuration of the child wireless node comprises control channel resources used for transmitting the grant; and
   selecting, based at least in part on the control channel resources and a processing time of the child wireless node, a scheduling gap for communicating the low latency communications with the child wireless node, the scheduling gap comprising a time gap between transmitting the grant and communicating the low latency communications with the child wireless node.

7. The method of claim 1, further comprising:
configuring a field in the grant to indicate that the low latency communications are to be performed.

8. The method of claim 1, further comprising:
selecting a radio network temporary identifier (RNTI) associated with low latency communications for the grant to indicate that the low latency communications are to be performed.

9. The method of claim 1, further comprising:
configuring the grant to indicate next-hop resources for the child wireless node to forward the grant and the low latency communications to a grandchild wireless node of the parent wireless node.

10. The method of claim 1, wherein the first communication link interface comprises a distributed unit function of the parent wireless node, and the second communication link interface comprises a mobile termination function of the parent wireless node.

11. A method for wireless communications at a child wireless node, comprising:
receiving, by a second communication link interface of the child wireless node, a grant from a parent wireless node indicating that low latency communications are to be performed and identifying time and frequency resources for the low latency communications;
overriding, autonomously by at least one of a first communication link interface of the child wireless node, or the second communication link interface of the child wireless node that is different from the first communication link interface, or a combination thereof, a previously configured resource type for the first communication link interface based at least in part on the low latency communications, wherein the previously configured resource type comprises an unavailable resource type for time and frequency resources where the time and frequency resources are restricted for use by the first communication link interface to an available resource type where the time and frequency resources are available for use by the first communication link interface, and wherein the previously configured resource type comprises at least one of a hard resource type, or a soft resource type indicated as available, or a combination thereof; and
communicating the low latency communications with the parent wireless node using resource identified in the grant, wherein the resources identified in the grant comprise at least a portion of the time and frequency resources of the overridden previously configured resource type.

12. The method of claim 11, further comprising:
determining that low latency communications are to be performed with the parent wireless node;
transmitting, based at least in part on the low latency communications, a scheduling request to the parent wireless node; and
overriding the previously configured resource type based at least in part on the scheduling request.

13. The method of claim 12, further comprising:
configuring the scheduling request to indicate that the low latency communications are to be performed.

14. The method of claim 11, further comprising:
determining that the previously configured resource type comprises the time and frequency resources that are restricted for the second communication link interface to use for communicating with the parent wireless node and are allocated for the first communication link interface to use for communicating with a downstream wireless node of the child wireless node;
overriding, by the second communication link interface of the child wireless node, a portion of the time and frequency resources of the previously configured resource type to use for receiving the grant and the low latency communications from the parent wireless node; and
overriding, by the first communication link interface of the child wireless node, the portion of the time and frequency resources of the previously configured resource type to cancel communicating with the downstream wireless node.

15. The method of claim 11, further comprising:
transmitting an interruption message to a downstream wireless node of the child wireless node indicating that wireless communications using the portion of the time and frequency resources of the previously configured resource type were interrupted.

16. The method of claim 11, further comprising:
decoding a field in the grant to identify the indication that the low latency communications are to be performed.

17. The method of claim 11, further comprising:
decoding a radio network temporary identifier (RNTI) in the grant; and
determining that the grant indicates that the low latency communications are to be performed based at least in part on the RNTI being associated with low latency communications.

18. The method of claim 11, wherein the first communication link interface comprises a distributed unit function of the child wireless node, and the second communication link interface comprises a mobile termination function of the child wireless node.

19. A method for wireless communications at a parent wireless node comprising:
receiving, prior to a determination that low latency communications having a latency below a threshold are to be performed with a child wireless node, a configuration signal configuring periodic or semi-static time and frequency resources;
receiving a scheduling request from the child wireless node, wherein the determination that low latency communications are to be performed is based at least in part on the scheduling request;
overriding, autonomously, a resource type associated with the periodic or semi-static time and frequency resources for a first communication link interface based at least in part on the scheduling request, wherein the resource type comprises an unavailable resource type for the periodic or semi-static time and frequency resources where the periodic or semi-static time and frequency resources are restricted for use by the first communication link interface to an available resource type where the periodic or semi-static time and frequency resources where the periodic or semi-static time and frequency resources are available for use by the first communication link interface, and wherein the resource type associated with the periodic or semi-static resources comprises at least one of a not available resource type, or a soft resource type indicated as not available, or a combination thereof; and
communicating, from the first communication link interface of the parent wireless node, the low latency communications with the child wireless node using resources identified in a grant, wherein the resources identified in the grant comprise at least a portion of the periodic or semi-static time and frequency resources of the overridden resource type.

20. The method of claim 19, wherein the scheduling request indicates that the low latency communications are to be performed.

21. The method of claim 19, further comprising:
  determining that the resource type associated with the periodic or semi-static time and frequency resources comprises time and frequency resources that are restricted for the first communication link interface to use for communicating with the child wireless node and are available for a second communication link interface to use for communicating with an upstream wireless node;
  overriding, by the first communication link interface of the parent wireless node, a portion of the time and frequency resources of the resource type to use for the low latency communications to the child wireless node; and
  overriding, by the second communication link interface of the parent wireless node, the portion of the time and frequency resources of the resource type to cancel communicating with the upstream wireless node.

22. The method of claim 19, further comprising:
  transmitting an interruption message to an upstream wireless node of the parent wireless node indicating that wireless communications using the portion of the periodic or semi-static time and frequency resources of the resource type were interrupted.

23. A method for wireless communications at a child wireless node comprising:
  receiving, prior to a determination that low latency communications having a latency below a threshold are to be performed with a parent wireless node, a configuration signal configuring periodic or semi-static time and frequency resources;
  transmitting a scheduling request to the parent wireless node, wherein the determination that low latency communications are to be performed is based at least in part on the scheduling request;
  overriding, autonomously by at least one of a first communication link interface of the child wireless node, or a second communication link interface of the child wireless node that is different from the first communication link interface, or a combination thereof, a resource type associated with periodic or semi-static time and frequency resources for the first communication link interface based at least in part on the scheduling request, wherein the resource type comprises an unavailable resource type for time and frequency resources where the periodic or semi-static time and frequency resources are restricted for use by the first communication link interface to an available resource type where the periodic or semi-static time and frequency resources are available for use by the first communication link interface, and wherein the resource type associated with the periodic or semi-static resources comprises at least one of a not available resource type, or a soft resource type indicated as not available, or a combination thereof; and
  communicating, from the first communication link interface of the child wireless node, the low latency communications with the parent wireless node using resources identified in a grant, wherein the resources identified in the grant comprise at least a portion of the periodic or semi-static time and frequency resources according to the overridden resource type.

24. The method of claim 23, wherein the scheduling request indicates that the low latency communications are to be performed.

25. The method of claim 23, further comprising:
  determining that the resource type associated with the periodic or semi-static time and frequency resources comprises time and frequency resources that are restricted for the first communication link interface to use for communicating with the parent wireless node and are allocated for the second communication link interface to use for communicating with a downstream wireless node;
  overriding, by the first communication link interface of the child wireless node, a portion of the time and frequency resources of the resource type to use for performing the low latency communications with the parent wireless node; and
  overriding, by the second communication link interface of the child wireless node, the portion of the time and frequency resources of the resource type to cancel communicating with the downstream wireless node.

26. The method of claim 23, further comprising:
  transmitting an interruption message to a downstream wireless node of the child wireless node indicating that wireless communications using the portion of the time and frequency resources of the resource type were interrupted.

* * * * *